(12) United States Patent
Nitschke et al.

(10) Patent No.: US 11,542,189 B2
(45) Date of Patent: Jan. 3, 2023

(54) ARTICULATED MOLD ARRANGEMENT FOR A GLASS PROCESSING SYSTEM

(71) Applicant: GLASSTECH, INC., Perrysburg, OH (US)

(72) Inventors: David B. Nitschke, Perrysburg, OH (US); Dean M. Nitschke, Maumee, OH (US); Cristin J. Reinhart, Delta, OH (US); Stephen D. Snyder, Whitehouse, OH (US); James P. Schnabel, Jr., Maumee, OH (US)

(73) Assignee: GLASSTECH, INC., Perrysburg, OH (US)

( * ) Notice: Subject to any disclaimer, the term of this patent is extended or adjusted under 35 U.S.C. 154(b) by 98 days.

(21) Appl. No.: 17/011,520

(22) Filed: Sep. 3, 2020

(65) Prior Publication Data

US 2022/0064047 A1    Mar. 3, 2022

(51) Int. Cl.
*C03B 23/03* (2006.01)

(52) U.S. Cl.
CPC ...... *C03B 23/0302* (2013.01); *C03B 2215/50* (2013.01); *C03B 2215/61* (2013.01)

(58) Field of Classification Search
CPC .......................... C03B 23/027; C03B 23/0302
See application file for complete search history.

(56) References Cited

U.S. PATENT DOCUMENTS

| 3,806,312 A | 4/1974 | McMaster et al. |
| 3,934,970 A | 1/1976 | McMaster et al. |
| 3,947,242 A | 3/1976 | McMaster et al. |
| 3,994,711 A | 11/1976 | McMaster |
| 4,202,681 A | 5/1980 | McMaster et al. |
| 4,222,763 A | 9/1980 | McMaster |
| 4,229,200 A | 10/1980 | Seymour |

(Continued)

FOREIGN PATENT DOCUMENTS

| FR | 1074107 A | * 10/1954 | |
| WO | 02/24588 A1 | 3/2002 | |
| WO | WO-2019207262 A1 | * 10/2019 | ........... C03B 23/027 |

OTHER PUBLICATIONS

FR 1074107 A Desciption EPO Machine Tranlsation Performed Apr. 29, 2022. (Year: 2022).*

(Continued)

*Primary Examiner* — Lisa L Herring
(74) *Attorney, Agent, or Firm* — Brooks Kushman P.C.

(57) ABSTRACT

An articulated lower mold arrangement for use with an upper mold includes a mold portion configured to bend a heated glass sheet. The mold portion has a first end, a sharp bend area proximate the first end for bending an end portion of the glass sheet, and a second end opposite the first end and spaced away from the sharp bend area. The arrangement may further include a first guide member connected to the mold portion at a first location proximate the first end, and a second guide member connected to the mold portion at a second location proximate the second end and spaced away from the sharp bend area. The mold portion and the guide members are cooperable to allow the first end of the mold portion to move from a lowered position to a raised position in order to move the end portion of the glass sheet upwardly.

26 Claims, 12 Drawing Sheets

(56) References Cited

U.S. PATENT DOCUMENTS

| | | | |
|---|---|---|---|
| 4,979,977 A * | 12/1990 | Frank | ............. C03B 23/0252 |
| | | | 65/288 |
| 9,452,948 B2 | 9/2016 | Nitschke et al. | |
| 2009/0320523 A1 | 12/2009 | Fukami et al. | |
| 2010/0269543 A1 | 10/2010 | Tellow et al. | |
| 2011/0100060 A1 | 5/2011 | Tellow | |

OTHER PUBLICATIONS

PCT International Search Report and Written Opinion of the International Search Authority, dated Dec. 15, 2021, Application No. PCT/US21/48827, Applicant Glasstech, Inc., 5 Pages.

* cited by examiner

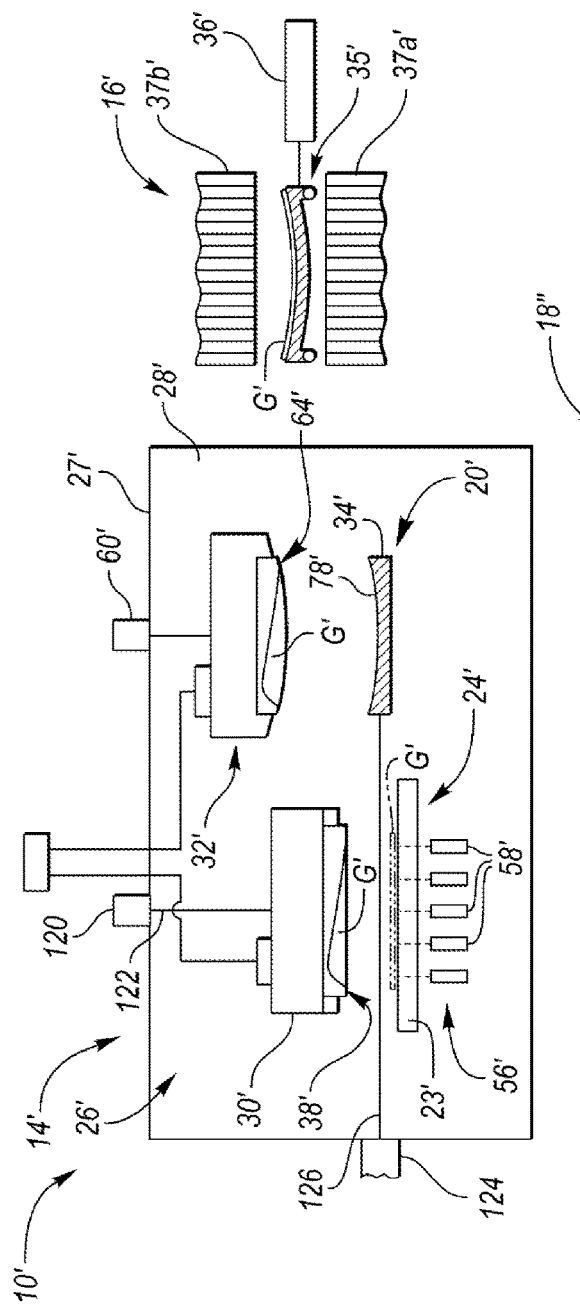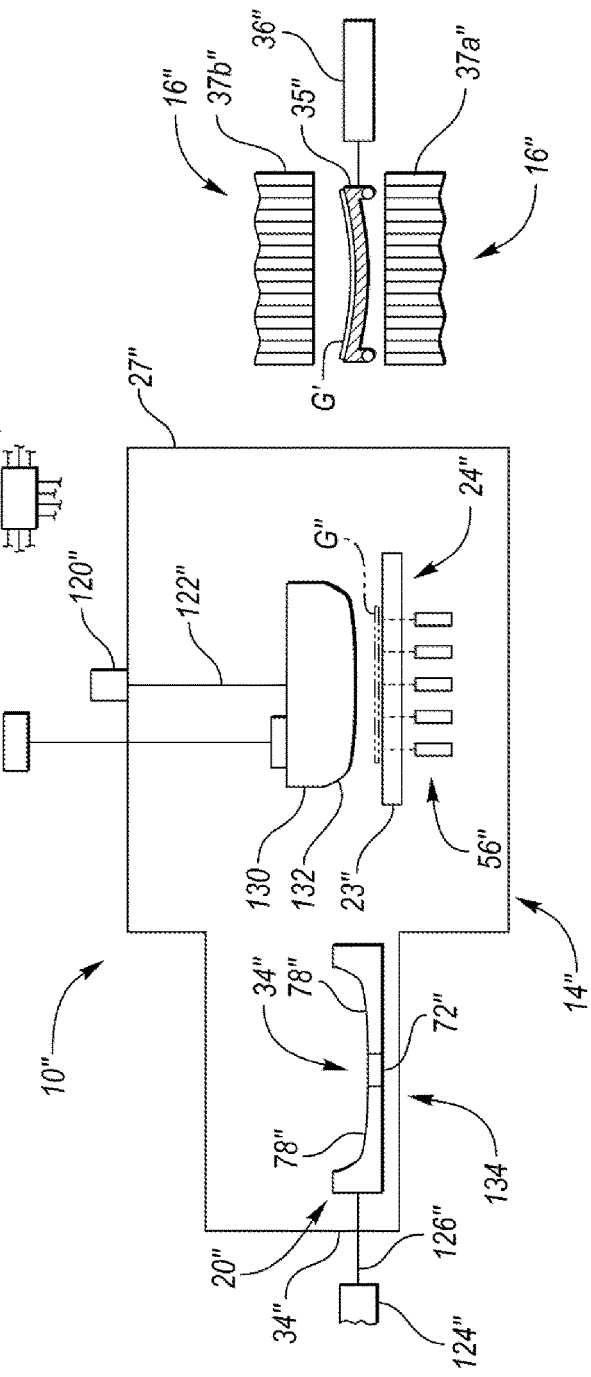

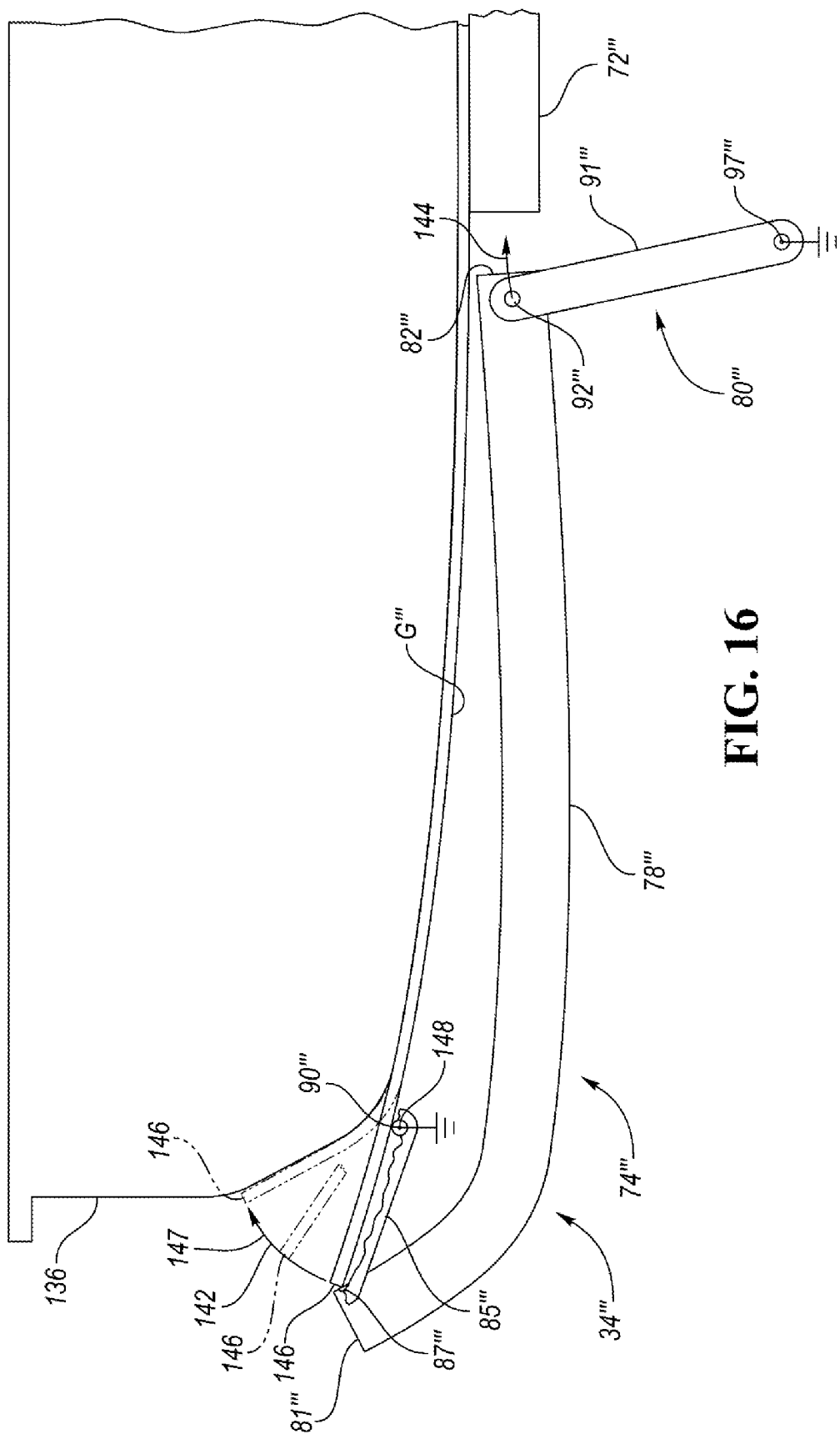

ARTICULATED MOLD ARRANGEMENT FOR A GLASS PROCESSING SYSTEM

TECHNICAL FIELD

The disclosure relates to an articulated mold arrangement for bending a glass sheet in a glass processing system.

BACKGROUND

Examples of glass sheet mold arrangements in the form of lower press rings are disclosed in U.S. Pat. No. 9,452,948 and International Publication No. WO 02/24588A1.

SUMMARY

In one embodiment according to the disclosure, an articulated lower mold arrangement is provided for use with an upper mold in a glass bending system. The articulated lower mold arrangement includes a mold portion configured to bend a heated glass sheet. The mold portion has a first end, a sharp bend area proximate the first end for bending an end portion of the glass sheet, and a second end opposite the first end and spaced away from the sharp bend area. The mold arrangement may further include a first guide member connected to the mold portion at a first location proximate the first end, and a second guide member connected to the mold portion at a second location proximate the second end and spaced away from the sharp bend area. The mold portion and the first and second guide members are configured to cooperate to allow the first end of the mold portion to move from a lowered position to a raised position in order to move the end portion of the glass sheet upwardly and so that the first end of the mold portion moves along a path substantially the same as a path taken by an end edge of the end portion of the glass sheet, while also allowing the second end of the mold portion to move substantially laterally.

A method for bending a heated glass sheet is also provided. The method may include positioning the glass sheet between a lower mold portion of an articulated lower mold arrangement and an upper mold. The lower mold portion may include a first end, a sharp bend area proximate the first end for bending an end portion of the glass sheet, and a second end opposite the first end and spaced away from the sharp bend area. The lower mold arrangement may further include a movement facilitating assembly associated with the lower mold portion for guiding movement of the lower mold portion. The movement facilitating assembly may be connected to the lower mold portion at a first location proximate the first end and a second location proximate the second end and spaced laterally away from the sharp bend area. The method may further include moving the lower mold portion upwardly toward the upper mold to bend the end portion of the glass sheet between the lower mold portion and the upper mold. Furthermore, the movement facilitating assembly may be configured to guide the first end of the lower mold portion to move along a path substantially the same as a path taken by an end edge of the end portion of the glass sheet and to guide the second end of the lower mold portion to move substantially laterally.

While exemplary embodiments are illustrated and disclosed, such disclosure should not be construed to limit the claims. It is anticipated that various modifications and alternative designs may be made without departing from the scope of the invention.

BRIEF DESCRIPTION OF THE DRAWINGS

FIG. 9 is a partial perspective view of the lower mold arrangement showing another portion of the linkage assembly, wherein FIG. 9 shows two side mold portions of the lower mold arrangement in the raised positions;

FIG. 14 is a sectional schematic view illustrating another embodiment of a three stage forming station including an articulated mold arrangement according to the disclosure;

FIG. 15 is a sectional schematic view illustrating another embodiment of a forming station including an articulated mold arrangement according to the disclosure;

FIG. 16 is a schematic view of a portion of an articulated mold arrangement, according to the present disclosure, for use with an upper mold for bending a glass sheet therebetween, wherein a side mold portion of the articulated mold arrangement is shown in a lowered position;

DETAILED DESCRIPTION

As required, detailed embodiments are disclosed herein; however, it is to be understood that the disclosed embodiments are merely exemplary and that various and alternative forms may be employed. The figures are not necessarily to scale; some features may be exaggerated or minimized to show details of particular components. Therefore, specific structural and functional details disclosed herein are not to be interpreted as limiting, but merely as a representative basis for teaching one skilled in the art. Furthermore, as those of ordinary skill in the art will understand, various features of the embodiments illustrated and described with reference to any one of the Figures may be combined with features illustrated in one or more other Figures to produce embodiments that are not explicitly illustrated or described. In addition, other embodiments may be practiced without one or more of the specific features explained in the following description.

During manufacture of a glass sheet product, such as a glass mirror panel for a solar power collection application, a vehicle windshield, rear window, or any other suitable product, it may be desirable to mold or bend a sheet of glass in connection with a forming or bending operation (e.g., to progressively wrap and press the glass sheet against a mold tool). In the present disclosure, methods and apparatuses are provided for bending glass sheets during such operations to improve glass processing (e.g., so that tighter radius bends may be made without mold marks caused by cuts in articulated mold arrangements).

Figure 1:
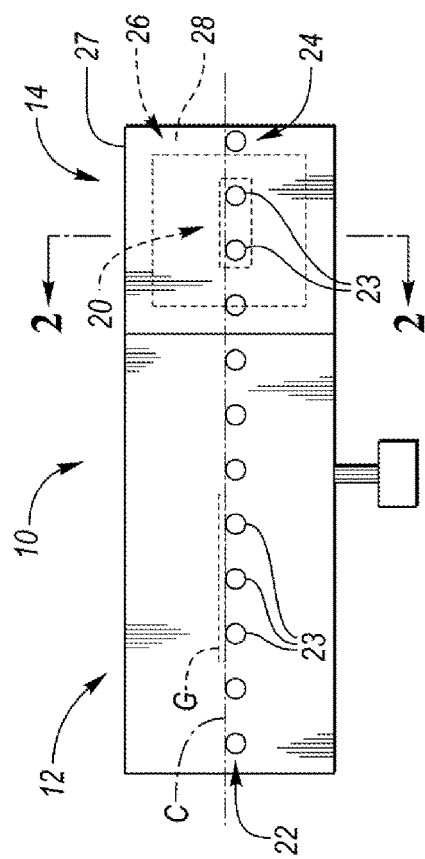
FIG. 1 is a schematic elevational view of a glass sheet processing system including a forming station having an articulated mold arrangement according to the disclosure for bending a heated glass sheet during processing.
Figure 2:
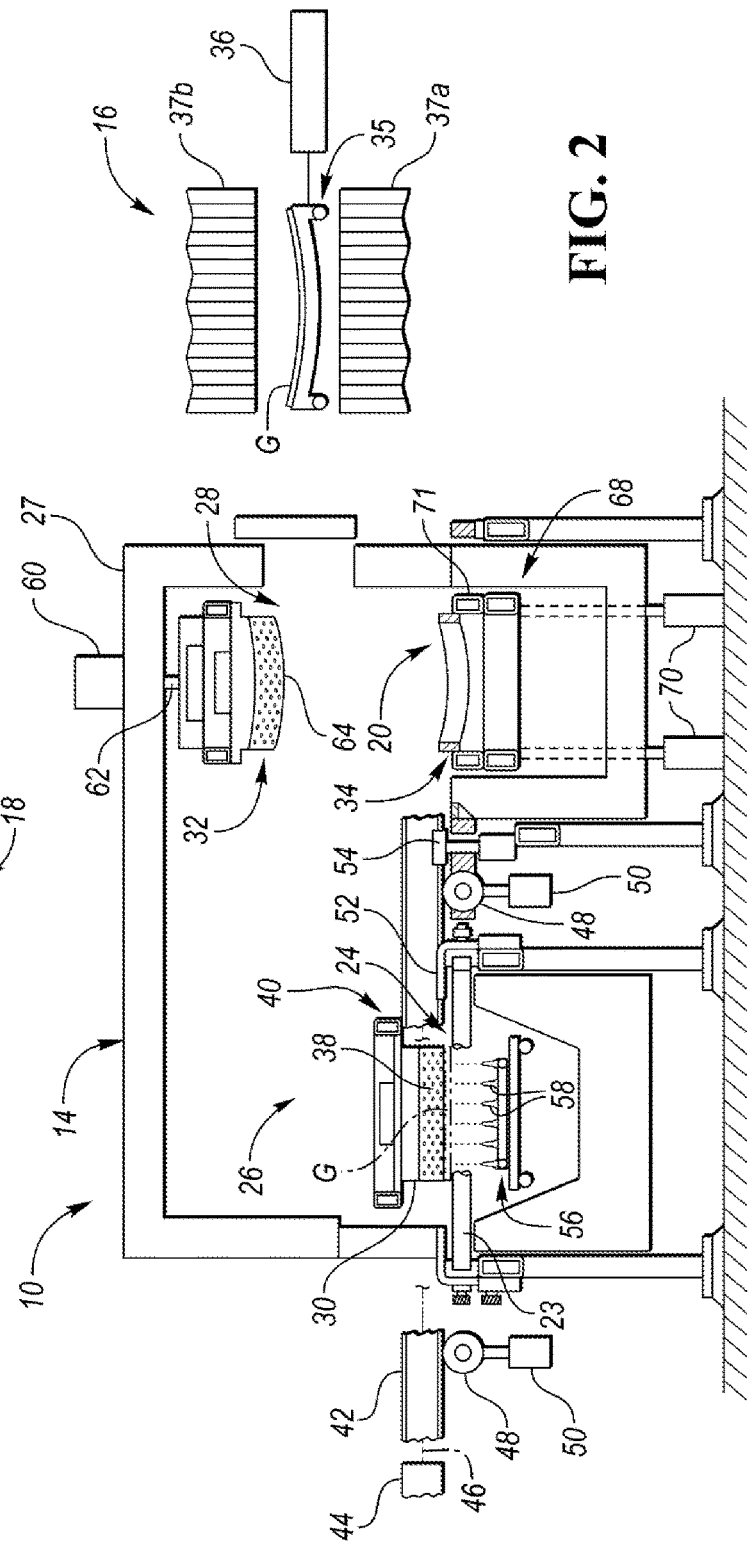
FIG. 2 is a sectional view taken along line 2-2 in FIG. 1 and illustrates a forming apparatus that includes first and second upper molds, and the articulated mold arrangement configured as a lower mold arrangement for performing three stage forming of a hot glass sheet with transverse curvature.

Referring to FIGS. 1 and 2, a glass processing system 10 is shown for processing glass sheets G. The system 10 includes a heating apparatus or station, such as a furnace 12, for heating the glass sheets G; a forming or bending station 14 for forming or bending each heated glass sheet G into a desired shape; a cooling station, such as an annealing station or a quench station 16, configured to cool each glass sheet G; and a control system 18 for controlling operation of the furnace 12, the bending station 14 and the quench station 16. In the embodiment shown in FIGS. 1 and 2, the system 10 further includes an articulated mold arrangement 20, according to the present disclosure, provided as part of the bending station 14 for bending glass sheets G during the forming or bending process, as explained below in detail.

The furnace 12 may have any suitable configuration for heating the glass sheets G. For example, the furnace 12 may include any suitable heating elements (not shown) positioned above and/or below a conveyor or conveyor system 22, which may be used to convey the glass sheets G in a generally horizontally extending orientation along a plane of conveyance C through the furnace 12. As a more detailed example, the heating elements may include radiant heating elements, such as electric heaters, and/or convective heating elements, such as hot gas or hot air distributors. The conveyor system 22 may be a roller conveyor type including rollers 23 like those disclosed by U.S. Pat. No. 3,806,312 McMaster; U.S. Pat. No. 3,934,970 McMaster et al., U.S. Pat. No. 3,947,242 McMaster et al.; and U.S. Pat. No. 3,994,711 McMaster et al., which are hereby incorporated by reference.

Likewise, the bending station 14 may have any suitable configuration for hot glass forming or bending each glass sheet G into a particular shape. For example, the bending station 14 may have a conveyor or conveyor system 24, which may be a separate conveyor system or part of the conveyor system 22, for receiving a heated glass sheet G; and a glass sheet forming apparatus or bending apparatus 26, shown schematically in FIG. 1, for forming or bending the glass sheet G. Furthermore, the bending station 14 has an insulated housing 27 defining a heated chamber 28 (e.g., heated to a temperature in the range of 610 to 725 degrees centigrade (° C.), or at least 600° C.) in which the bending apparatus 26 is at least partially located.

Figure 4:
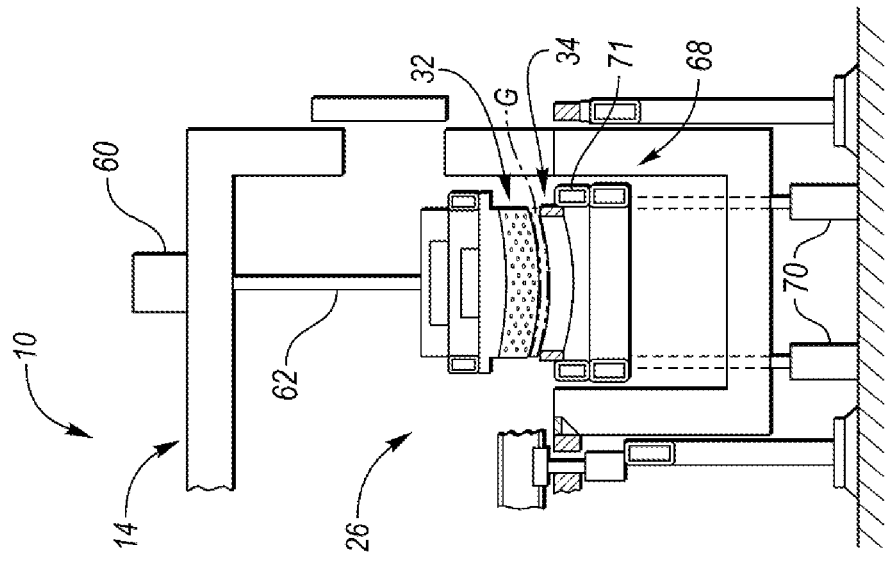
FIG. 4 is a partial view of the forming station of FIG. 2 illustrating the second upper mold cooperating with the lower mold arrangement to press form a glass sheet.

Referring to FIG. 2, the bending apparatus 26 may be configured as a multiple stage bending apparatus for bending a glass sheet G in multiple stages (e.g., three stages). In the embodiment shown in FIG. 2, the bending apparatus 26 includes a first upper mold 30 that functions during a first stage of the hot glass sheet forming or bending and a second upper mold 32 that functions during a press forming stage of the hot glass sheet forming. As mentioned above, the articulated mold arrangement 20 according to the disclosure may be provided as part of the bending station 14 for bending glass sheets G during the forming or bending process. For example, the articulated mold arrangement 20 may function as an articulated lower mold arrangement 34 (e.g., articulated lower press ring arrangement) of the bending apparatus 26. Furthermore, the lower mold arrangement 34 may be configured to receive a glass sheet G from the first upper mold 30 for gravity sagging, after the first upper mold 30 has moved horizontally from its pickup position shown in FIG. 2 to a delivery position above the lower mold arrangement 34 shown in FIG. 3. After the glass sheet G is deposited on the lower mold arrangement 34 by the first upper mold 30, the first upper mold 30 moves back from its delivery position shown in FIG. 3 to its pickup position shown in FIG. 2. Furthermore, the lower mold arrangement 34 moves upwardly and/or the second upper mold 32 moves downwardly, as shown in FIG. 4, so that the second upper mold 32 cooperates with the lower mold arrangement 34 in press forming the glass sheet G. The lower mold arrangement 34 may also function to wrap or bend end portions of the glass sheet G against the second upper mold 32, as explained below in detail. After the forming, the second upper mold 32 moves upwardly with the glass sheet G supported against it by a drawn vacuum, and a delivery mold 35 shown in FIG. 2 is moved from the quench station 16 into the forming station 14, by an actuator 36, to receive the glass sheet G for movement back out to the quench station 16 between lower and upper quench heads 37a and 37b, respectively, for quenching.

As shown in FIG. 2, the first upper mold 30 has a downwardly facing surface 38 that has a downwardly convex shape. The mold surface 38 may also have straight line elements or generally straight line elements (e.g., line elements that each have 5 mm or less cross bend) that may be provided by a cylindrical shape or a partial conical shape. The first upper mold 30 also has a frame 40 that is supported by elongated beams 42 (only one shown) that are moved by an actuator 44 through a connection 46. These beams 42 are supported by associated rollers 48 that are mounted by actuators 50 to provide vertical movement of the beams and hence vertical movement of the first upper mold 30 during its operation. More specifically, the first upper mold 30 can be moved downwardly to about one half inch (e.g., 12 to 16 mm) from the conveyor system 24 for the initial pickup of the glass sheet G and can then be moved upwardly so as to move above hot end covers 52 located at the ends of conveyor rollers 23 to reduce heat flow from the interior of the bending station to the bearings at the hot ends of the rollers. Lateral rollers 54 also contact the beams 42 to provide lateral positioning during movement of the first upper mold 30 between its pickup position shown in FIG. 2 and its delivery position shown in FIG. 3.

Further bending station details are disclosed in U.S. Pat. No. 9,452,948, which is hereby incorporated by reference in its entirety.

Figure 3:
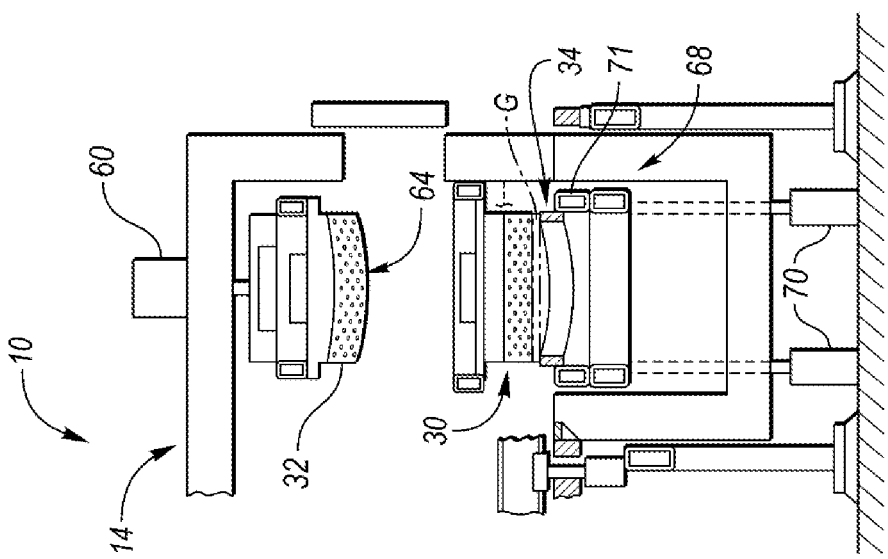
FIG. 3 is a partial view of the forming station of FIG. 2 illustrating the first upper mold positioned over the lower mold arrangement during a cycle of operation of the system.

The bending station 14 may further include a lift device 56, such as a gas lift jet array, for lifting the heated glass sheet G toward the first upper mold 30. The lift device 56 is located below the plane of conveyance C of the glass sheet G and includes multiple, spaced apart lift jet outlets or gas jet outlets 58, such as nozzles, spouts, or pumps, that supply upwardly directed gas jets (e.g., jet streams) for lifting the glass sheet G upwardly from the conveyor system 24 to initially form and support the glass sheet against the downwardly facing surface 38 of the first upper mold 30, which is then moved laterally to its delivery position with the glass sheet G supported against its downwardly facing surface 38, as shown in FIG. 3. The downwardly facing surface 38 of the first upper mold 30 may also have an array of vacuum holes through which a vacuum may be drawn to assist in initial lifting of the glass sheet G and to then support the glass sheet against the downwardly facing surface 38.

As shown in FIG. 2, the second upper mold 32 of the bending station 14 is positioned above the lower mold arrangement 34 within the heated chamber 28 of the bending station housing 27, and is movable vertically by an actuator 60 and a connection 62. The vertical movement of the second upper mold 32 is between an upper position, shown in FIGS. 2 and 3, and a lower position, shown in FIG. 4, for performing the pressing forming. The second upper mold 32 has a downwardly facing surface 64 of a downwardly convex shape with curvature in transverse directions without any straight line elements. The second upper mold 32 also has an array of vacuum holes in its downwardly facing surface 64 for forming and supporting the heated glass sheet G against the second upper mold 32 during the forming cycle.

A vacuum source (not shown) is operable to provide a vacuum at the downwardly facing surfaces 38 and 64 of the first and second upper molds 30 and 32, respectively. Actually, the source of vacuum can be provided by positive pressure air supplied to gas jet pumps on the first and second upper molds 30 and 32, respectively, and the jet pumps may be of the type disclosed by U.S. Pat. Nos. 4,202,681 and 4,222,763 so as to be capable of drawing varying degrees of vacuum, as well as providing positive pressure air for providing glass sheet release during the forming operation as is hereinafter more fully described.

Referring to FIGS. 2 and 3, the lower mold arrangement 34 faces upwardly and may be configured to provide an upwardly concave shape in transverse directions that is complementary to the downwardly convex shape of the downwardly facing surface 64 of the second upper mold 32. The lower mold arrangement 34 as illustrated is supported by a support structure, such as framework 68, that is supported by actuators 70, such as screw jacks, for vertical movement. This vertical movement can be downward to allow the first upper mold 30 to move over the lower mold arrangement 34 and then upward so that the release of the glass sheet G is at a more closely spaced relationship to control positioning. In addition, the vertical movement of the lower mold arrangement 34 can also be used in cooperation with the vertical movement of the second upper mold 32 to perform the press bending.

Figure 5:
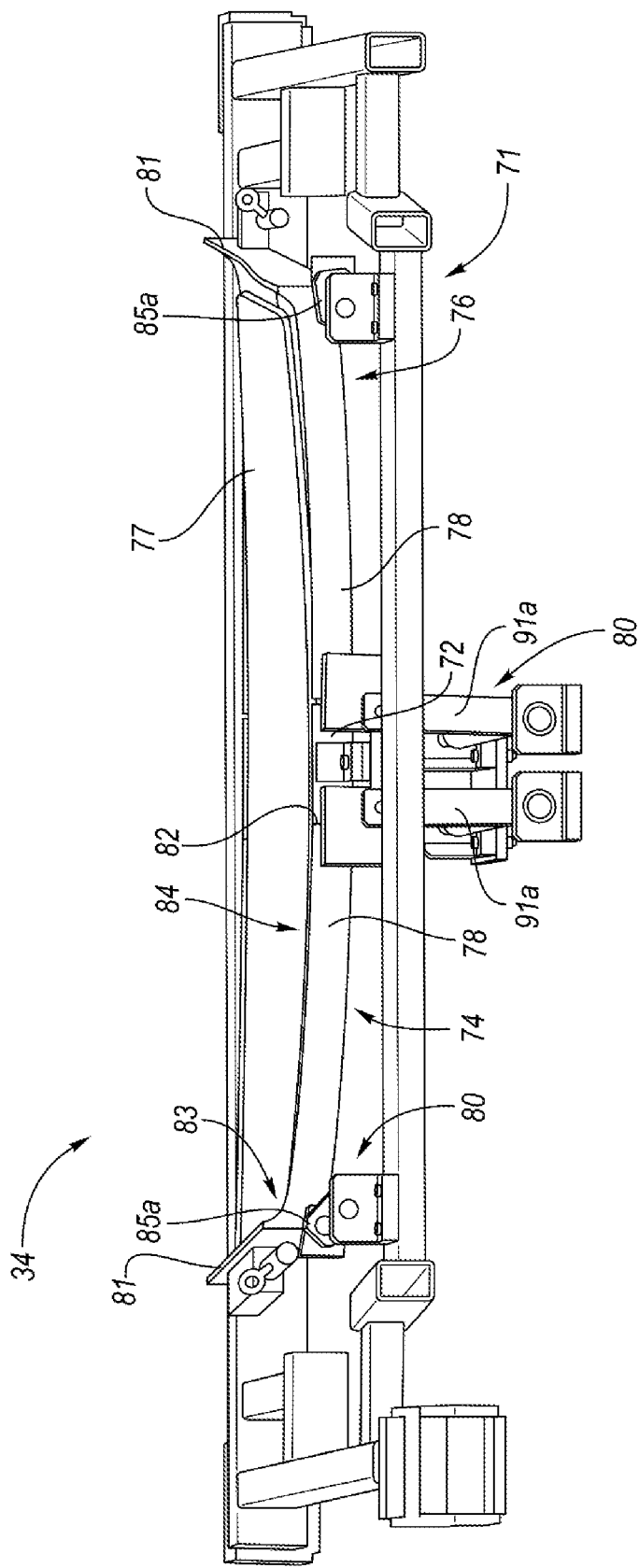
FIG. 5 is a partial perspective view of the lower mold arrangement.

Referring to FIG. 5, the lower mold arrangement 34 has a novel design to facilitate press bending of the glass sheet G. For example, the lower mold arrangement 34 may be configured as an articulated mold arrangement to provide bending of end edges or portions of the glass sheet G, while reducing or eliminating defects in the glass sheet G at the bend locations. In the embodiment shown in FIG. 5, the lower mold arrangement 34 includes a support structure or frame 71 supported by (e.g., fixedly connected to) the framework 68, an intermediate or middle mold section or portion 72 (e.g., an intermediate ring section or segment) fixedly connected to the frame 71 for supporting an intermediate or middle portion of the glass sheet G, first and second side sections or portions 74 and 76, respectively, that extend on opposite sides of the intermediate mold portion 72, and a central glass support pad 77 that extends between the side portions 74 and 76 and that may be fixedly attached to the frame 71. The pad 77 may support a majority of the glass sheet G and bring it into proximity to the downwardly facing surface 64 of the second upper mold 32 so that vacuum drawn at the downwardly facing surface 64 can draw a central area of the glass sheet G toward the downwardly facing surface 64. In another embodiment, the lower mold arrangement 34 may be provided without the pad 77.

The intermediate mold portion 72 may be fixedly attached to the frame 71 so that the intermediate mold portion 72 is fixed with respect to frame 71 and the framework 68 (shown in FIG. 2). Each side portion 74, 76 includes a side mold portion 78 (e.g., wing or side ring section or segment) movably attached to the frame 71 for bending a respective end portion of the glass sheet G, and a movement facilitating assembly, such as a linkage assembly 80, configured to allow the side mold portion 78 to move relative to the frame 71, the intermediate mold portion 72 and the pad 77, if included, from a lowered position to a raised position in order to move the respective end portion of the glass sheet upwardly and wrap the end portion of the glass sheet G against the downwardly facing surface 64 of the second upper mold 32. In that regard, the pad 77, if included, may be stationarily mounted to the frame 71 so that pad 77 is positioned inside (e.g., within outer boundaries of) the side mold portions 78 of the side portions 74, 76, and so that the side mold portions 78 are movable with respect to the pad 77. Furthermore, each linkage assembly 80 may also allow the respective side mold portion 78 to move laterally.

In the illustrated embodiment, each side mold portion 78 has a first end or outer end 81, a second end or inner end 82, and a mold surface that defines first and second mold areas, such as outer and inner mold areas 83 and 84, respectively. The outer mold area 83, which may be 30 cm or less in length, for example, is positioned adjacent the outer end 81 of the side mold portion 78 and comprises a sharp bend area positioned proximate or near the outer end 81 of the side mold portion 78 for bending a respective end portion of the glass sheet G. For example, a center portion of the sharp bend area may be positioned within 2 to 28 cm of an outer end edge of the side mold portion 78. The outer mold area 83, which extends inwardly to just beyond the sharp bend area, may also include a relatively flat area positioned between the sharp bend area and the outer end edge of the side mold portion 78. The inner mold area 84 extends from the outer mold area 83 to the inner end 82 of the side mold portion 78 and comprises a flat area or a curved area having a larger radius of curvature than the sharp bend area. Example profiles for the outer and inner mold areas are shown schematically in FIGS. 16-19 (and labelled in FIG. 19), for example, which figures are discussed below in greater detail.

Figure 6:
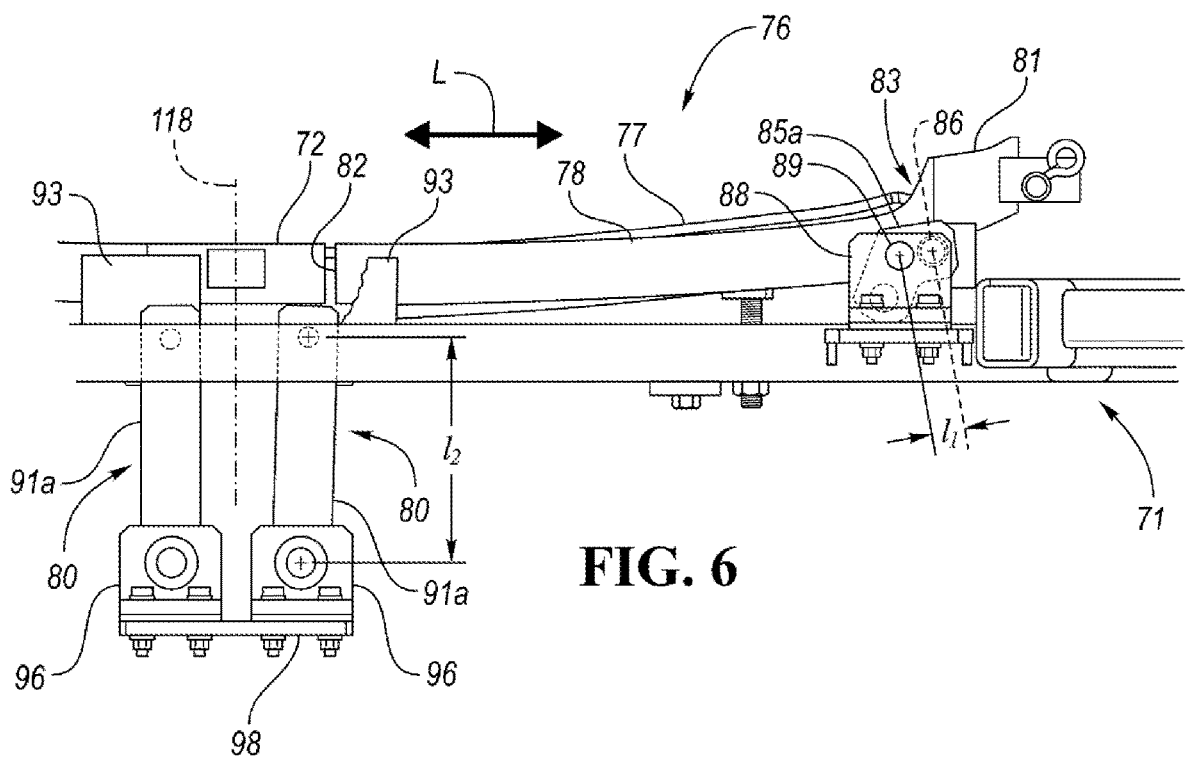
FIG. 6 is a partial side view of the lower mold arrangement showing a side mold portion in a lowered position.

In the embodiment shown in FIG. 5, the side mold portion 78 of the second side portion 76 is shown in the lowered position, and the side mold portion 78 of the first side portion 74 is shown in the raised position. Referring to FIG. 6, when each side mold portion 78 is in the lowered position, there is a gap between the inner end 82 of each side mold portion 78 and the intermediate mold portion 72. Referring to FIG.

7, when each side mold portion 78 is in the raised position, each side mold portion 78 is positioned closer to the intermediate mold portion 72 so that the gap is reduced in size or eliminated. For example, the inner end 82 of each side mold portion 78 may be within 0.3 cm or less of the intermediate mold portion 72 (e.g., spaced away from the intermediate mold portion 72 by a distance in the range of 0.01 to 0.3 cm) when the side mold portions 78 are in the raised positions.

Figure 7:
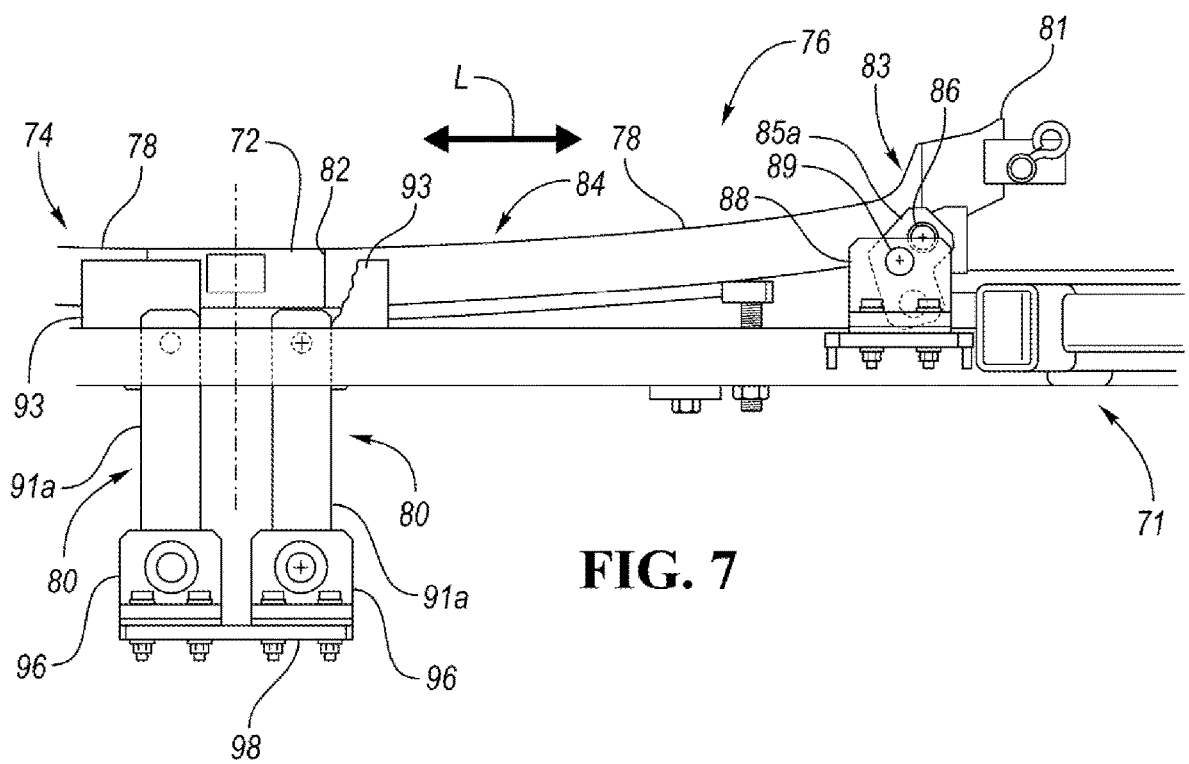
FIG. 7 is a partial side view similar to FIG. 6 showing the side mold portion in a raised position.

FIG. 6 shows the side mold portion 78 of the second side portion 76 in the lowered position, and FIG. 7 shows the side mold portion 78 of the second side portion 76 in the raised position. The side mold portion 78 of the first side portion 74 is movable in a similar manner. Furthermore, each side mold portion 78 may have a length measured in a lateral direction L that is at least as long, or at least twice as long, as a length of the intermediate mold portion 72. In another embodiment, the lower mold arrangement 34 may be provided without the intermediate mold portion.

Figure 8:
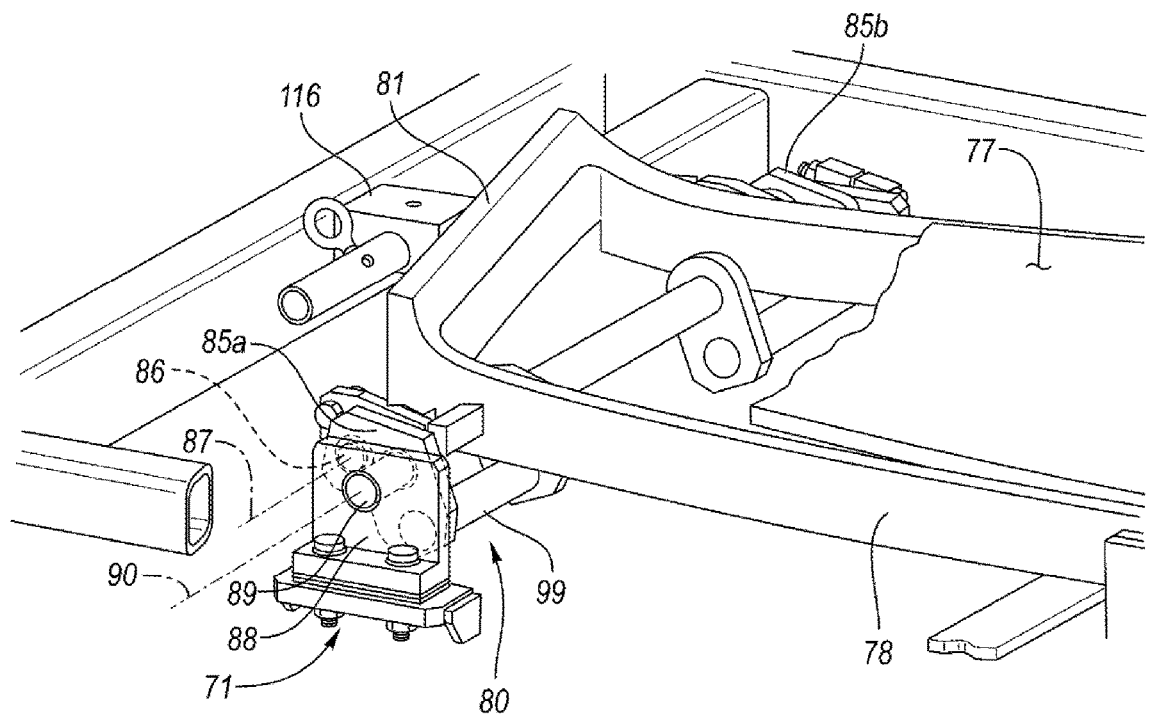
FIG. 8 is a partial perspective view of the lower mold arrangement showing a portion of a movement facilitating assembly, configured as a linkage assembly, attached to a side mold portion, which is shown in the lowered position.

Referring to FIGS. 6-9, each linkage assembly 80 includes a first guide member or first link 85a pivotally connected to the respective side mold portion 78 at a first location proximate the outer end 81 of the side mold portion 78, such as with a pivot member or shaft 86, so that the first link 85a is pivotable about a first axis 87 (shown in FIG. 8) that extends through the first location. The first link 85a is further pivotally connected to a first support member 88, such as with a pivot member or shaft 89, so that the first link 85a is also pivotable about an axis 90 that extends through the first support member 88. The first support member 88 may be any suitable support member, such as a bearing member or a frame member. In the embodiment shown in the figures, the first support member 88 is a bearing block that is attached to a frame member of the frame 71. Furthermore, in the illustrated embodiment, the pivot shaft 89 is positioned inward of the pivot shaft 86, and extends below the pivot shaft 86, when the respective side mold portion 78 is in the lowered position (as shown in FIG. 8) and in the raised position.

In addition, each linkage assembly 80 includes a second guide member or second link 91a pivotally connected to the respective side mold portion 78 at a second location proximate the inner end 82 of the side mold portion 78, and spaced away from the first location and the sharp bend area, so that the second link 91a is pivotable about a second axis 92 (shown in FIG. 9) that extends through the second location. In the illustrated embodiment, the second link 91a is pivotally connected to a bracket 93 with a pivot member or shaft 94, and the bracket 93 is fixedly attached to the respective side mold portion 78, such as with one or more fasteners and/or welds. The bracket 93 on the right side of the lower mold arrangement 34 is broken away in various Figures to show the intermediate mold portion 72, which is positioned behind the brackets 93 and not connected to the brackets 93. In another embodiment, the second link 91a may be pivotally attached directly to the respective side mold portion 78. The second link 91a is further pivotally connected to a second support member 96, such as a bearing member or a frame member, so that the second link 91a is pivotable about an axis 97 that extends through the second support member 96. In the embodiment shown in the figures, the second support member 96 is a bearing block that is attached to a frame member 98. Furthermore, the first and second support members 88 and 96, respectively, and the frame members to which the support members 88 and 96 are attached may all be considered parts of the frame 71. In addition, the frame 71 and the framework 68 may together be considered a common support structure of the lower mold arrangement 34.

For each side portion 74, 76, the side mold portion 78 and the links 85a and 91a are configured to cooperate to allow the side mold portion 78 to move from a lowered position, such as shown in FIG. 6, to a raised position, such as shown in FIG. 7, and to guide that movement, in order for the side mold portion 78 to move at least a portion (e.g., end portion) of the glass sheet G upwardly. Furthermore, for each side portion 74, 76, the side mold portion 78 and the links 85a and 91a are configured to cooperate to allow the side mold portion 78 to move laterally toward the intermediate mold portion 72 when the side mold portion 78 is moved from the lowered position to the raised position. As a result, and as mentioned above, a gap that may exist between the respective side mold portion 78 and the intermediate mold portion 72 when the side mold portion 78 is in the lowered position may be reduced or eliminated when the side mold portion 78 is moved to the raised position. For example, for each side portion 74, 76, the side mold portion 78 and the links 85a and 91a may form a four bar linkage with the frame 71, and each four bar linkage may be configured to guide upward pivotal movement of the respective side mold portion 78, while also guiding lateral movement of the side mold portion 78.

Furthermore, referring to FIG. 6, for each side portion 74, 76 in the illustrated embodiment, the first link 85a has a first effective length $l_1$ and the second link 91a has a second effective length $l_2$ that is at least twice as long as the first effective length $l_1$. In the illustrated embodiment, the sharp bend area is relatively short so the first effective length $l_1$ of the first link 85a is relatively short, but the first effective length $l_1$ and the second effective length $l_2$ are strongly dependent on the glass shape being made, so the effective lengths $l_1$ and $l_2$ may each be any suitable length. With any of the above configurations, an end (e.g., inner end) of each side mold portion 78 positioned adjacent the intermediate mold portion 72 may only move slightly vertically, while also moving laterally toward the intermediate mold portion 72, when the side mold portion 78 is moved from the lowered position to the raised position. For example, when each side mold portion 78 moves from the lowered position to the raised position, the inner end 82 of the side mold portion 78 may move vertically by a distance in the range of 0.05 to 3.0 cm, while moving laterally inward by distance in the range of 0.3 to 15 cm.

Figure 9:
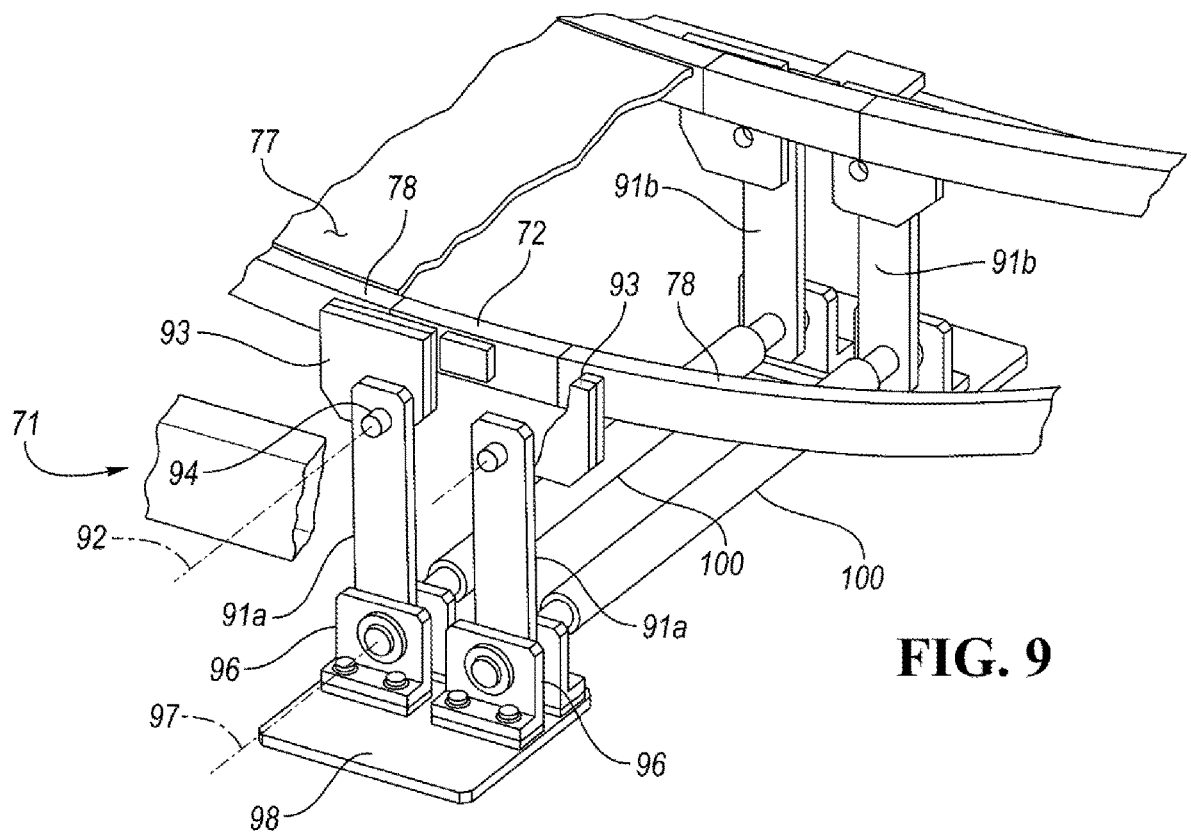

Referring to FIGS. 8 and 9, each linkage assembly 80 may include corresponding first and second guide members or links 85b and 91b, respectively, positioned on a side of the respective side mold portion 78 opposite the side on which the first and second links 85a and 91a, respectively, are positioned. Furthermore, for each linkage assembly 80, the first links 85a and 85b may be connected together by a connecting member, such as a synchronization shaft 99, so that the first links 85a and 85b move together. Likewise, for each linkage assembly 80, the second links 91a and 91b may be connected together by a connecting member, such as a synchronization shaft 100, so that the second links 91a and 91b move together. In the embodiment shown in FIGS. 8 and 9, the first links 85a and 85b on opposite sides of a respective side mold portion 78 are mirror images of each other, and the second links 91a and 91b on opposite sides of the respective side mold portion 78 are also mirror images of each other.

Figure 10:
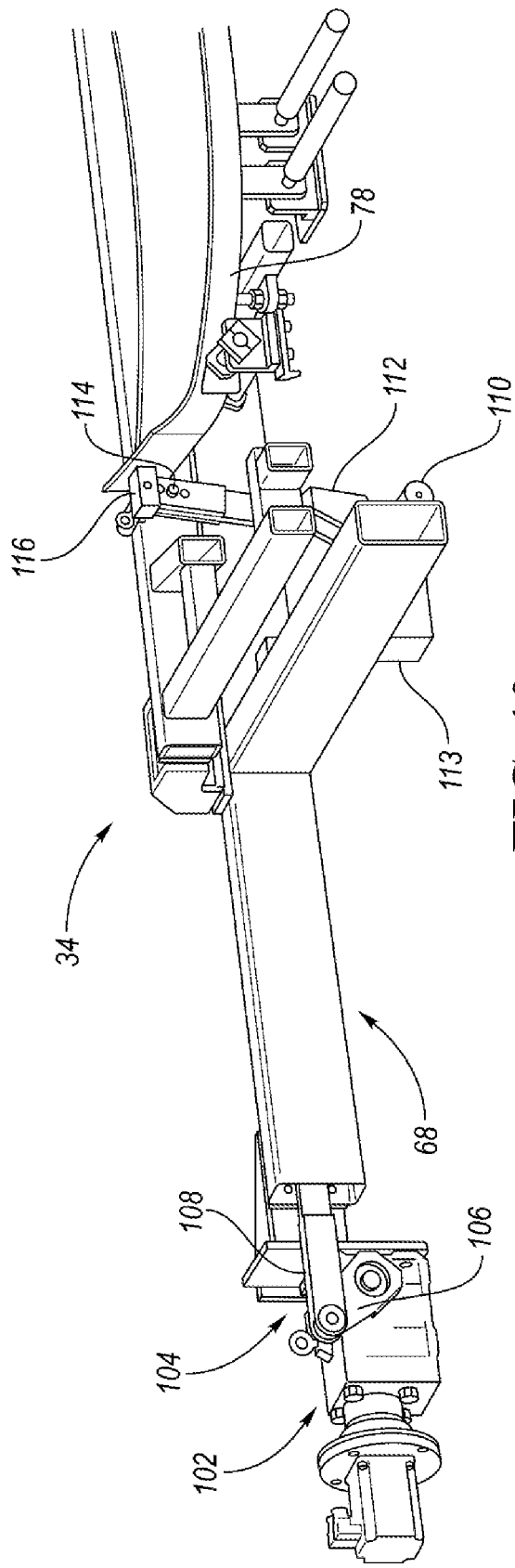
FIG. 10 is a partial perspective view of the lower mold arrangement showing an actuator and associated linkage assembly for moving a side mold portion of the lower mold arrangement.
Figure 11:
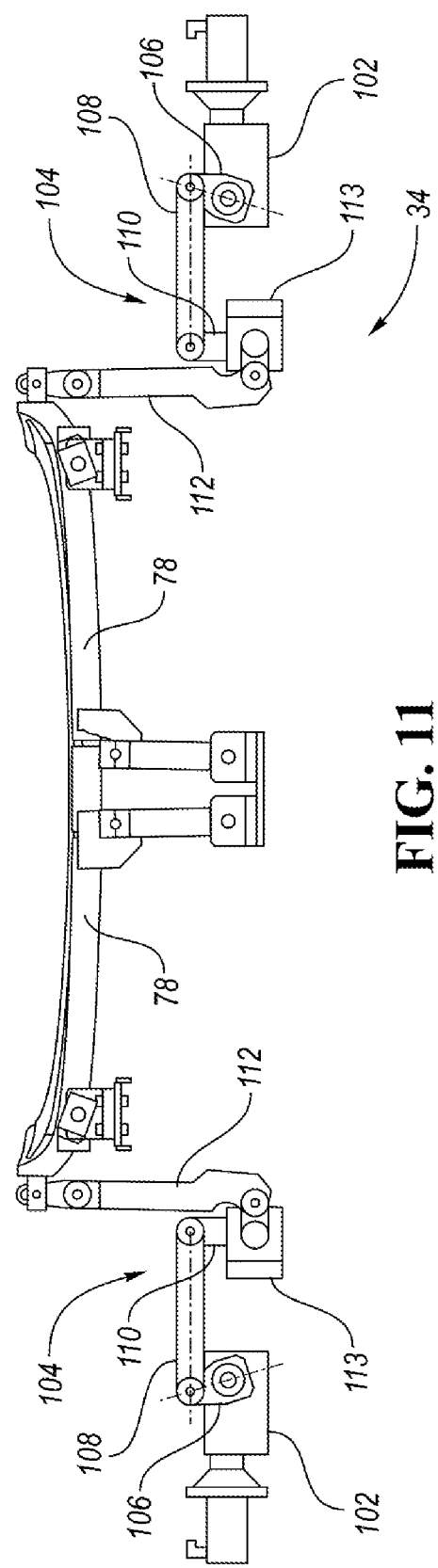
FIG. 11 is a side view of the lower mold arrangement showing each side mold portion in the lowered position.

Referring to FIGS. 10 and 11, the lower mold arrangement 34 further includes one or more actuators 102 mounted on the framework 68 for moving each side mold portion 78 (e.g., each outer end 81) between the lowered and raised positions. In the illustrated embodiment, the lower mold arrangement 34 includes an actuator 102 connected to each side mold portion 78 via a linkage assembly 104, and each actuator 102 may be controlled by the control system 18 shown in FIG. 1. Each linkage assembly 104 may include any suitable members or links for facilitating movement of the respective side mold portion 78. For example, each linkage assembly 104 may include a first member or crank 106 fixedly connected as the output shaft of the actuator 102, a second member or link 108 pivotably connected to the crank 106, a third member or crank shaft 110 pivotably connected to the second link 108, and a fourth member or link 112 pivotably connected to the crank shaft 110 and pivotably connected to the side mold portion 78. In the embodiment shown in FIGS. 10 and 11, the second link 108 extends into the framework 68, and the crank shaft 110 is a shaft with two crank arms having ends separated by 90° and the shaft is rotatably mounted on two support members or blocks, one shown as block 113 which is fixed to the framework 68 as shown in FIG. 10. Referring to FIGS. 8 and 10, the fourth link 112, with a clevis at both ends, may be pivotably connected to a shaft or pin 114 that is fixedly connected to the side mold portion 78 by a bar that is locked into attachment block 116.

Each actuator 102 is operable to move the associated linkage assembly 104 between a first configuration shown in FIGS. 11 and 12, and a second configuration shown in FIG. 13, in order to move the associated side mold portion 78 between the lowered position shown in FIGS. 11 and 12, and the raised position shown in FIG. 13 so that the side mold portions 78 may bend the end portions of the glass sheet G as explained below in detail. Note that in FIGS. 10, 11, 12 and 13, the linkage assemblies 80 including the links 85a and the mounting blocks 88 have been shifted down and inwardly from their positions that may be required to produce a travel path at the outer end 81 of each side mold portion 78 that may match a path of the respective end of the glass sheet G during operation of the lower mold arrangement 34. This shift in position was made in these Figures to more clearly show the link 112 of the associated linkage assembly 104, and may not represent their actual positions in use. Furthermore, the glass sheet G is shown as only a thin sheet in FIG. 11 for the purposes of clarity.

Figure 12:
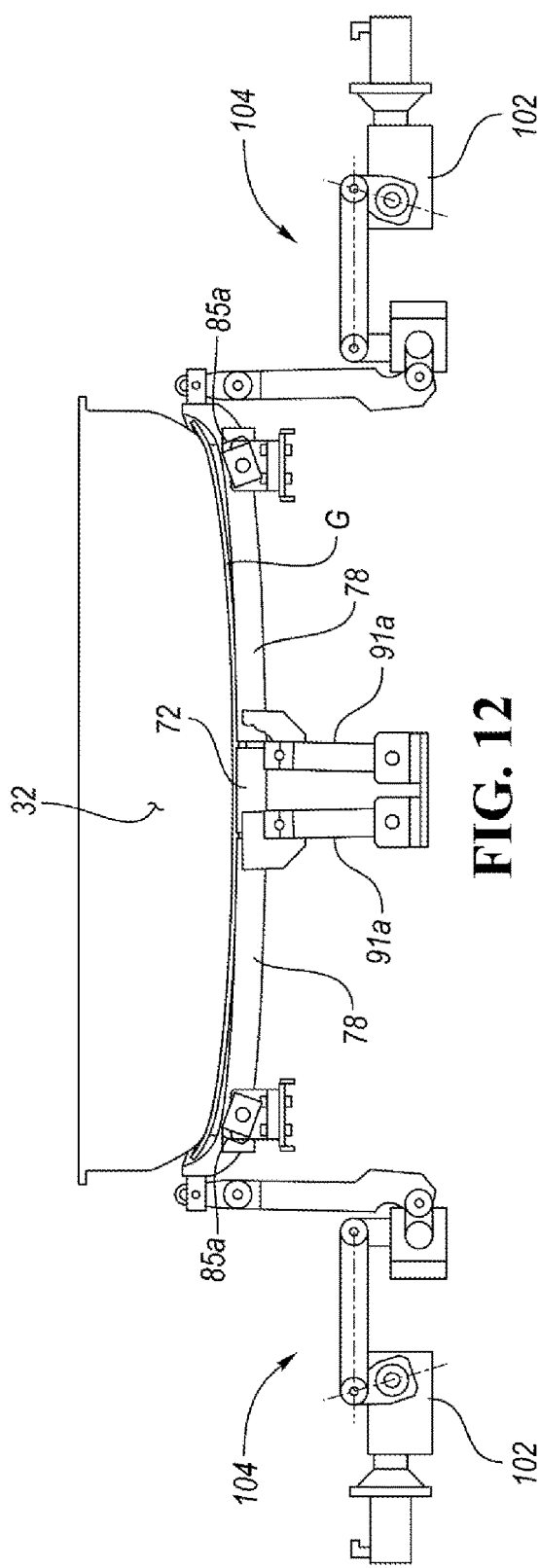
FIG. 12 is a side view of the lower mold arrangement positioned adjacent the second upper mold.
Figure 13:
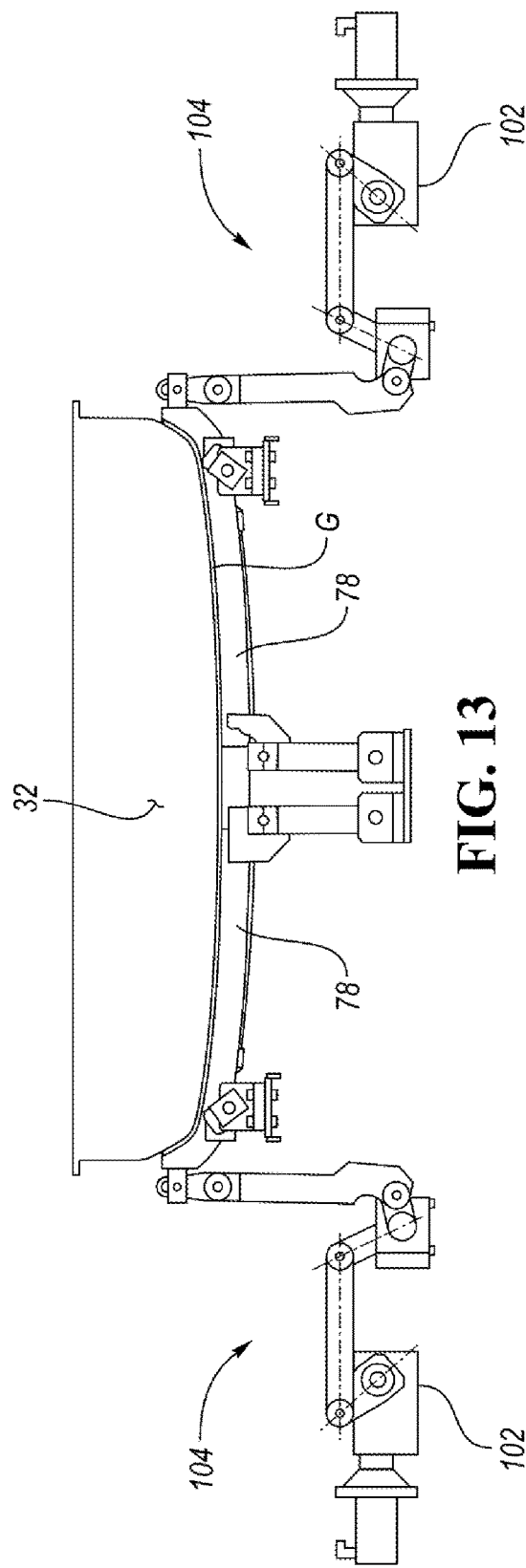
FIG. 13 is a side view of the lower mold arrangement positioned adjacent the second upper mold with each side mold portion in the raised position.

Referring to FIGS. 1-4 and 11-13, operation of the system 10 will now be described in more detail. Processing of the glass sheet G in the system 10 may begin by heating the glass sheet G (such as to a temperature in the range of 575° C. to 675° C., or to a temperature of at least 575° C.) in the furnace 12, and subsequent conveying of the glass sheet G into the bending station 14 to begin the press forming or bending operation. The lift device 56 may then be operated to lift the glass sheet G off of the conveyor system 24 and against the downwardly facing mold surface 38 of the first upper mold 30. After the glass sheet G is supported against the first upper mold 30, the first upper mold 30 may move upwardly, to clear the roll end covers 52, and then horizontally from its pickup position shown in FIG. 2 to a delivery position shown in FIG. 3 where the glass sheet G is released onto lower mold arrangement 34. The first upper mold 30 may therefore function as a transfer device for transferring the heated glass sheet G from the conveyor system 24 to the lower mold arrangement 34. After the glass sheet G is deposited on the lower mold arrangement 34 by the first upper mold 30, the first upper mold 30 is moved back from its delivery position shown in FIG. 3 to its pickup position shown in FIG. 2 to pickup another glass sheet. The second upper mold 32 is also moved downwardly and/or the lower mold arrangement 34 is moved upwardly, as shown in FIGS. 4 and 12, so that the second upper mold 32 may cooperate with the lower mold arrangement 34 in press forming the glass sheet G. When the lower mold arrangement 34 is positioned adjacent the second upper mold 32, the actuators 102 may be operated to move the linkage assemblies 104 from the first configuration shown in FIG. 12 to the second configuration shown in FIG. 13, in order to move each side mold portion 78 (e.g., each outer end 81) from the lowered position shown in FIG. 12 to the raised position shown in FIG. 13 so that end portions of the glass sheet G may be bent upwardly and pressed against the second upper mold 32 (i.e., the end portions of the glass sheet G may be wrapped against the second upper mold 32). The actuators 102 may be operated simultaneously or independently so that each side mold portion 78 may be moved independently of the other side mold portion 78. Furthermore, in some applications, only one actuator 102 may be operated, so that only one side mold portion 78 is moved between the lowered and raised positions.

In the above method of operation, the side mold portions 78 are positioned in their lowered positions prior to the lower mold arrangement 34 receiving the glass sheet G from the first upper mold 30, and the side mold portions 78 are moved to their raised positions after the glass sheet G is pressed between the pad 77 of the lower mold arrangement 34 and the second upper mold 32 (or after the frame 71 of the lower mold arrangement 34 and the second upper mold 32 have reached their final pressing positions). The side mold portions 78 may, however, be moved to their raised positions at any suitable time. For example, the side mold portions 78 may be moved to their raised positions prior to the lower mold arrangement 34 receiving the glass sheet G from the first upper mold 30. Next, the side mold portions 78 may be moved to their lowered positions prior to the glass sheet G being pressed between the lower mold arrangement 34 and the second upper mold 32, and then the side mold portions 78 may be moved to their raised positions when the glass sheet G is being pressed between the lower mold arrangement 34 and the second upper mold 32 so that the end portions of the glass sheet G can be wrapped against the second upper mold 32.

After the press forming and wrapping of the glass sheet G, the second upper mold 32 is moved upwardly with the glass sheet G supported against its downwardly facing surface 64 by a drawn vacuum as previously described, and the delivery mold 35 shown in FIG. 2 is moved from the quench station 16 into the bending station 14 to receive the glass sheet G for movement back out to the quench station 16 between the lower and upper quench heads 37a and 37b for quenching.

The above configuration of the lower mold arrangement 34 may provide numerous benefits. First, because there are no gaps or hinge cuts at or near small radius areas or sharp bend areas (e.g., complex bend areas) of the side mold portions 78 (e.g., proximate the outer ends 81 of the side mold portions 78 shown in the figures), the glass sheet G can be bent against the second upper mold 32 without causing distortion or irregularities at the periphery of the glass sheet G in areas of high edge strain (e.g., at curved areas near end edges of the glass sheet G) where forces against the side mold portions 78 may be the greatest. Referring to FIG. 6, for example, any gaps or hinge cuts of the lower mold arrangement 34 are positioned proximate the intermediate portion 72 or a central plane 118 of the lower mold arrangement 34 (e.g., less than 30 cm from the central plane 118), where the bending radius of the glass sheet G is very large and the force that the lower mold arrangement 34 must exert to press the glass sheet G against the second upper mold 32 is very small, so that such gaps or hinge cuts are spaced away from the outer ends 81 of the side mold portions 78. Prior lower mold or ring configurations, however, may include gaps or hinge cuts at or near such high edge strain areas, and, as a result, may leave hinge cut marks at or near edges of the bent glass sheets.

Second, the pivotable links 85, 91, or other members or devices of the linkage assemblies 80 or other movement facilitating assemblies that are used to guide movement of the side mold portions 78, may be arranged so as to provide an arcuate travel path on a side of each side mold portion 78 that is most distant from the central plane 118 of the lower mold arrangement 34. That arc may be substantially the same as or closely match the travel path of the corresponding part or end edge of the glass sheet G as the glass sheet G is wrapped progressively against the second upper mold 32, or other mold, from a center of the glass sheet G to that end edge. As a result, relative motion of the glass end portions over the side mold portions 78 may be minimized as the side mold portions 78 force the glass sheet G to the second upper mold 32, consequently reducing the likelihood (compared to non-hinged lower molds) that that relative motion will cause chips of glass to be pulled out of the edges of the glass sheet G during the high forces needed to complete the wrapping of the glass sheet G to the second upper mold 32.

Third, with the above configuration, lifetime of a mold cloth on the second upper mold 32, or other mold, may be extended (compared to non-hinged lower molds). In that regard, in a mode of bending glass sheets using a fixed-shape lower mold or press ring and a curved upper mold, if bend areas at the sides of the upper mold are sharp enough, then when the upper mold presses a flat glass sheet into the lower mold, a cloth covered surface of the upper mold will contact the glass sheet at two points, one near each end portion of the glass sheet, for example. At the time of contact, there may be a space between the glass sheet and the upper mold between those points of contact. Furthermore, the length between the contact points measured on the mold face of the upper mold is less than the length measured along the glass sheet between the points of contact. So, as the pressing continues and as vacuum at the mold surface of the upper mold draws a central area of the glass sheet toward the upper mold, the extra length of glass sheet will slide outward along the surface of the mold cloth. If the bends in the upper mold are sharp enough, and the bends continue around toward 90 degrees, then it is possible that the contact force between the glass sheet and the mold cloth may be so high that the glass sheet grabs the mold cloth instead of sliding, and rolls the fibers of the mold cloth up as the glass sheet moves toward the outer ends of the lower mold and upper mold. Sticky paint on the glass sheet at the end portions can also add to the problem. However, the space between the glass sheet and the upper mold that exists from the start of bending with a fixed-shape lower mold or ring can be avoided by using the articulated lower mold arrangement according to the disclosure, without the problem of hinge-marks. For example, with the articulated lower mold arrangement described above, a glass sheet may first contact the center of an upper mold when the glass sheet is pressed between the articulated lower mold arrangement and the upper mold. Furthermore, the region of contact can be expanded outward from the center progressively, never leaving a gap trapped between two contact points of the glass sheet and the upper mold, so the glass may roll out on a cloth covered mold surface of the upper mold from the center to the outer ends of the upper mold. No pocket is trapped and no extra glass slides over the mold cloth. As a result, mold cloth lifetime can be extended.

Referring to FIG. 14, a second embodiment 14' of a three stage forming or bending station is shown with which an articulated mold arrangement 20' according to the present disclosure may be used. The forming station 14' is part of a glass processing system 10' that has an upstream furnace (not shown), like the glass processing system 10 described above in detail. Furthermore, the forming station 14' has many of the same components that operate like those of the previously described embodiment, such that like references numerals are applied to like components, except that the reference numbers for the components of the forming station 14' may each include a prime mark. Furthermore, much of the previous description is applicable to the forming station 14' and thus will not be repeated. In addition, further details of such a forming station may be found in U.S. Pat. No. 9,809,485, which is hereby incorporated by reference in its entirety.

In the embodiment shown in FIG. 14, first upper mold 30' is not movable laterally, but rather is only movable vertically, such as by an actuator 120 and suitable connection 122. Furthermore, the articulated mold arrangement 20' is configured as an articulated lower mold arrangement 34' that is movable laterally, such as by an actuator 124 and suitable connection 126. With the above configuration, the framework 68 mentioned above with respect to the lower mold arrangement 34 may be omitted, and the lower mold arrangement 34' may instead be mounted on a slidable shuttle frame that is connected to the actuator 124. In addition, side mold portions 78' of the lower mold arrangement 34' may be movable via suitable linkage assemblies and actuators (not shown), such as described above with respect to the lower mold arrangement 34. It should be noted that with the lower mold arrangement 34' shown in FIG. 14, the side mold portions 78' and an intermediate portion (not shown) are arranged along a line extending into and out of the paper, so that only a schematic cross-sectional view of one of the side mold portions 78' is visible. Furthermore, FIG. 14 shows a schematic cross-sectional view of the lower mold arrangement 34' and delivery mold 35'.

In the forming station 14' illustrated in FIG. 14, a glass sheet G' heated by an upstream furnace (not shown) and positioned on a conveyor system 24' may be lifted off of rolls or rollers 23' of the conveyor system 24' by lift device 56', so that the glass sheet G' may be received by the first upper mold 30'. As mentioned above, the first upper mold 30' may also have an array of vacuum holes through which a vacuum may be drawn to assist in initial lifting of the glass sheet G' and to then support the glass sheet against the first upper mold 30'.

The first upper mold 30' may then be raised to an upper position shown in FIG. 14 so that the lower mold arrangement 34' may be moved to a position beneath the first upper mold 30' by the actuator 124. The first upper mold 30' is then movable downwardly to release the glass sheet G' for transfer onto the lower mold arrangement 34'. The release of the glass sheet G' can be provided by termination of vacuum drawn at mold surface 38' of the first upper mold 30' and termination of upwardly directed gas jets provided by the lift jet device 56', as well as by providing positive pressure gas to the mold surface 38'. The first upper mold 30' may therefore function as a transfer device for transferring the heated glass sheet G' from the conveyor system 24' to the lower mold arrangement 34'. The first upper mold 30' is then moved upwardly to its upper position and the lower mold arrangement 34' and the glass sheet G' supported thereon are moved horizontally to a location below the second upper mold 32' while in its upper position as shown in FIG. 14 (glass sheet G' is not shown positioned on the lower mold arrangement 34' in FIG. 14). During this movement, the glass sheet G' may sag by gravity toward the shape of the intermediate mold portion (not shown) and side mold portions 78' of the lower mold arrangement 34', or the glass sheet G' may be supported by a pad (e.g., like the above-mentioned pad 77) of the lower mold arrangement 34'. The second upper mold 32' is then moved downwardly from its upper position shown in FIG. 14 to its lower position to cooperate with the lower mold arrangement 34' to press form the glass sheet G' with curvature in transverse directions. When the lower mold arrangement 34' is positioned adjacent the second upper mold 32', one or both of the side mold portions 78' may be moved from lowered to raised positions, in a manner similar to that described above with respect to the lower mold arrangement 34, so that the side mold portions 78' may press or wrap end edges or portions of the glass sheet G' upwardly against the mold surface 64' of the second upper mold 32'. The second upper mold 32' may then have a vacuum drawn at its downwardly facing surface 64' to support the glass sheet G' against the surface 64' as the second upper mold 32' is moved upwardly to its upper position shown in FIG. 14.

The glass forming operation continues by the lower mold arrangement 34' being moved out from under the second upper mold 32' and back under the first upper mold 30', while the delivery mold 35' is moved from its FIG. 14 position at the quench station 16' to a location below the second upper mold 32' to receive the glass sheet G', as the vacuum is terminated at the second upper mold 32' so the glass sheet G' drops onto the delivery mold 35'. The delivery mold 35' is then moved by its actuator 36' out of the bending station 14' for delivery or further processing of the pressed formed glass sheet, such as by quenching in the quench station 16' between lower and upper quench heads 37a' and 37b'.

Referring to FIG. 15, a third embodiment 14" of a forming or bending station is shown with which an articulated mold arrangement 20" according to the present disclosure may be used. The forming station 14" is part of a glass processing system 10" that has an upstream furnace (not shown), like the glass processing system 10 described above in detail. Furthermore, the forming station 14" has many of the same components that operate like those of the previously described embodiments, such that like references numerals are applied to like components, except that the reference numbers for the components of the forming station 14" may each include a double prime mark. Furthermore, much of the previous description is applicable to the forming station 14" and thus will not be repeated. In addition, further details of a similar forming station may be found in U.S. Pat. No. 4,661,141, which is hereby incorporated by reference in its entirety.

In the embodiment shown in FIG. 15, the forming station 14" includes a single upper mold 130 that is movable vertically, such as by an actuator 120" and suitable connection 122". The articulated mold arrangement 20" is again configured as an articulated lower mold arrangement 34" that is movable laterally, such as by an actuator 124" and suitable connection 126", and the lower mold arrangement 34" is cooperable with a mold surface 132 of the upper mold 130 to press form glass sheets therebetween. Side mold portions 78" of the lower mold arrangement 34" are further movable via suitable movement facilitating assemblies (e.g., linkage assemblies and actuators, not shown), such as described above with respect to the lower mold arrangement 34.

In the forming station 14" illustrated in FIG. 15, a glass sheet G" (shown in phantom lines) heated by an upstream furnace (not shown) and positioned on a conveyor system 24" may be lifted off of rolls or rollers 23" of the conveyor system 24" by lift device 56", so that the glass sheet G" may be received by the upper mold 130. The upper mold 130 may also have an array of vacuum holes through which a vacuum may be drawn to assist in initial lifting of the glass sheet G" and to then support the glass sheet against the first upper mold 130.

The upper mold 130 may then be raised with the glass sheet G" to an upper raised position so that the lower mold arrangement 34" may be moved by the actuator 124" from a position in a heated area of the forming station 14", such as a hot station or box 134, to a position underneath the upper mold 130. Next, the upper mold 130 may be lowered so that the glass sheet G" may be pressed formed between the upper mold 130 and the lower mold arrangement 34". The lift device 56" may continue to operate and support the glass sheet G" against the upper mold 130 until the glass sheet G" contacts the lower mold arrangement 34", for example. When the lower mold arrangement 34" is positioned adjacent the upper mold 130, one or both of the side mold portions 78" may be moved from lowered to raised positions, in a manner similar to that described above with respect to the lower mold arrangement 34, so that the side mold portions 78" may press or wrap end portions or wings of the glass sheet G" upwardly against the mold surface 132 of the upper mold 130. The upper mold 130 may continue to have a vacuum drawn at its downwardly facing surface 132 to support the glass sheet G" against the surface 132 as the upper mold 130 is moved upwardly to the raised position.

The glass forming operation may continue by the lower mold arrangement 34" being moved out from under the upper mold 130 and back to the position in the hot box 134, shown in FIG. 15, while a delivery mold 35" is moved from its FIG. 15 position at quench station 16" to a location below the upper mold 130 to receive the glass sheet G", as the vacuum is terminated at the upper mold 130 so the glass sheet G" drops onto the delivery mold 35". The delivery mold 35" is then moved by its actuator 36" out of the bending station 14" for delivery or further processing of the pressed formed glass sheet, such as by quenching in the quench station 16" between lower and upper quench heads 37a" and 37b".

It should be noted that FIG. 15 shows a schematic cross-sectional view of the delivery mold 35". Furthermore, the lower mold arrangement 34" and the upper mold 130 have each been rotated 90° about a vertical axis from a typical orientation in order to show the side mold portions 78" of the lower mold arrangement 34" and sharp bend areas of the upper mold 130.

Figure 17:
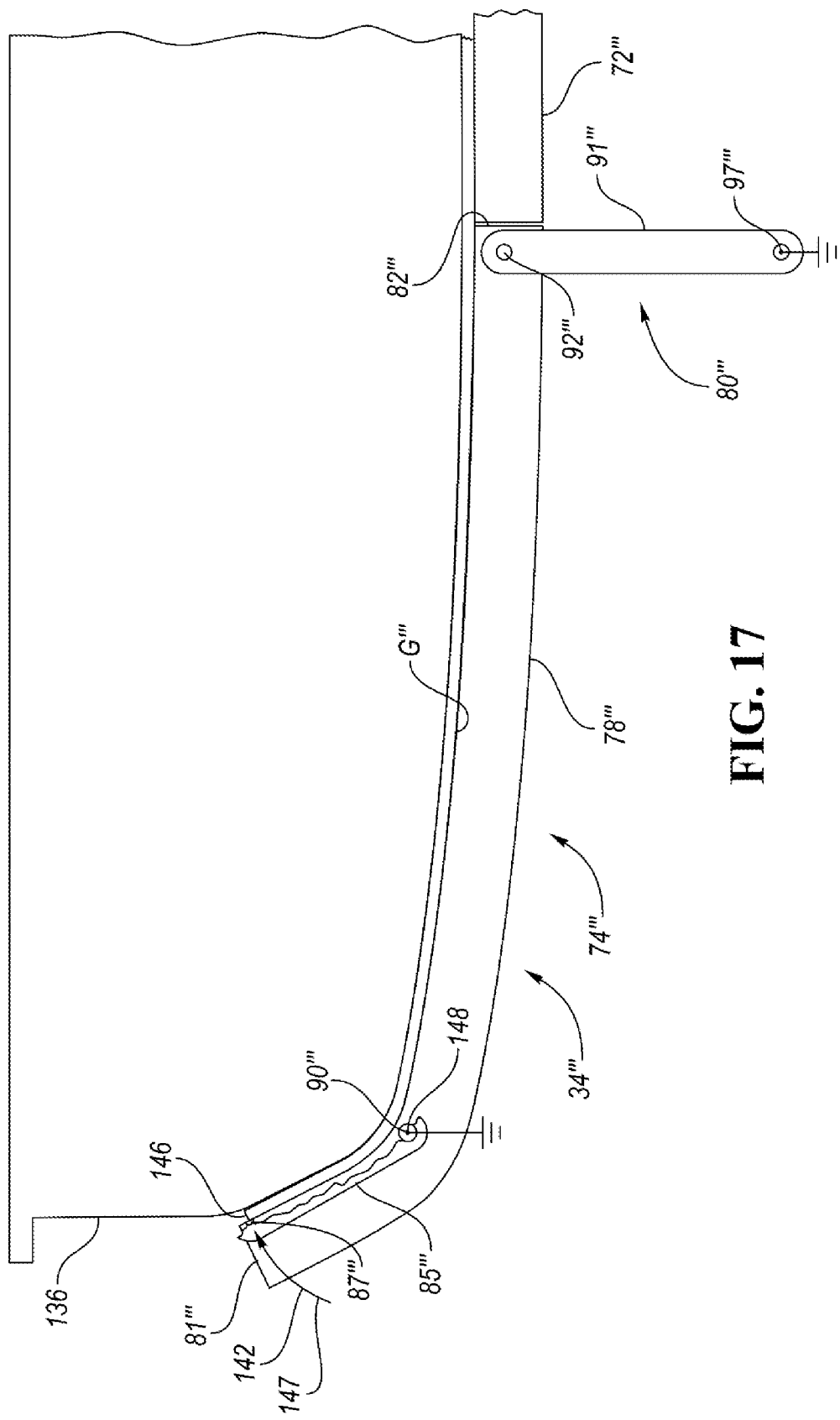
FIG. 17 is a schematic view similar to FIG. 16 showing the side mold portion of the articulated mold arrangement in a raised position.

FIGS. 16 and 17 are schematic views showing a portion of an articulated lower mold arrangement 34''', according to the present disclosure, for use with an upper mold 136 for bending a glass sheet G''' therebetween. The lower mold arrangement 34''' may represent any of the lower mold arrangements described above in detail. Only a first side portion 74''' (e.g., left side portion) and an intermediate or middle mold portion 72''' of the lower mold arrangement 34''' are shown. The lower mold arrangement 34''' may, however, include a second side portion (e.g., right side portion, not shown) that is similar to the first side portion 74″, as mentioned above with respect to the other lower mold arrangements. As another option, the lower mold arrangement 34‴ may be provided without the intermediate portion 72‴. In such a case, side mold portions 78‴ of the first and second side portions may be positioned adjacent each other. Furthermore, as mentioned above with respect to the lower mold arrangement 34, the lower mold arrangement 34‴ includes a movement facilitating assembly, such as a linkage assembly 80‴, for each side portion for guiding movement of the side mold portion 78‴ of the respective side portion. Each linkage assembly 80‴ may include first and second guide members, such as first and second links 85‴ and 91‴, respectively, for guiding movement of the side mold portion 78‴ from a lowered position, shown in FIG. 16, to a raised position, shown in FIG. 17, so that the side mold portion 78‴ may move an end portion of the glass sheet G‴ upwardly and wrap the end portion against the upper mold 136. Furthermore, as shown in FIG. 16, each linkage assembly 80‴ defines first and second pivot axes or pivot points 90‴ and 97″, respectively, for the side mold portion 78‴. The first pivot point 90‴ together with the first link 85‴ (shown broken away to show an end portion of the glass sheet G‴, which is in contact with the side mold portion 78″) and pivot axis or point 87‴ on the side mold portion 78‴ define the upward motion of a first or outer end 81‴ of the side mold portion 78‴ to be an arc 142 about the first pivot point 90‴, and the second pivot point 97‴ together with the second link 91‴ and pivot axis or point 92‴ on the side mold portion 78‴ define lateral motion of a second or inner end 82‴ of the side mold portion 78‴ to be an arc 144 about second pivot point 97‴.

As the glass sheet G‴ is bent against a downwardly facing surface of the upper mold 136, the glass sheet G‴ will wrap progressively outwardly from a center of the mold surface over a sharp bend in the mold surface, and an outer end edge 146 of the glass sheet G‴ will sweep along a curved line in space indicated by unwrapped, half wrapped and fully wrapped representations 146 of the outer end edge of the glass sheet G‴ in FIG. 16. That curved line may be approximated to within about 1 mm by a circular arc 147 about a fixed center point 148. For a mold portion or hinged ring that has a single pivot point at a center point of the arc 147, a glass contact area on an outer end of such a ring will substantially follow a path of an outer end edge of the glass sheet, as the outer end of the ring moves from a lowered position to a raised position. If, as in the presently disclosed lower mold arrangement 34″, the side mold portion 78‴ is guided along the arc 142 by the first link 85‴ with one pivot point 90‴ on a stationary support (e.g., frame member of the above-mentioned frame 71, or a bearing block that is attached to such a frame member), and one pivot point 87‴ on the side mold portion 78″, then if the pivot point 90‴ is positioned at the center point 148 of the arc 147 of the outer end edge of the glass sheet G‴, and the pivot point 87‴ on the side mold portion 78‴ is positioned in line with the outer end edge of the glass sheet G‴, then the arc 142 of the side mold portion 78‴ will lie on top of the arc 147 of the outer end edge of the glass sheet G‴, and the glass contact area of the outer end 81‴ of the side mold portion 78‴ may substantially follow the path of the outer end edge of the glass sheet G‴ as the outer end edge of the glass sheet G‴ is wrapped to the mold 136. To a small extent, the travel path of the outer end 81‴ of the side mold portion 78‴ may be affected by the travel path of the inner end 82‴ of the side mold portion 78″, and small adjustments in the location of the pivots point 90‴ and 87‴ may need to be made to compensate for such effect. As noted above, in FIG. 16, the motion of the inner end 82‴ of the side mold portion 78‴ is made to follow the circular arc 144 around pivot point 97‴ by the second link 91‴. The arc 142 for the outer end 81‴ of the side mold portion 78‴ has some upward extent and some lateral extent, and as the outer end 81‴ moves upwardly along the arc 142, both the outer end 81‴ and the inner end 82‴ of the side mold portion 78‴ move laterally. The inner end 82‴ of the side mold portion 78‴ follows the top of the arc 144 and therefore moves in a substantially lateral direction.

As a result, the outer end 81‴ of the side mold portion 78″, and specifically the portion of the outer end 81‴ that contacts the outer end edge of the end portion of the glass sheet G‴, may move along the path 142 that is substantially the same as the path taken by the outer end edge of the end portion of the glass sheet G‴ when the side mold portion 78‴ moves from the lowered position to the raised position, while the inner end 82‴ of the side mold portion 78‴ moves substantially laterally toward the intermediate mold portion 72‴, or other side mold portion (not shown) if the intermediate mold portion 72‴ is not included. For example, the path 142 of the portion of the outer end 81‴ that contacts the outer end edge of the end portion of the glass sheet G‴ may be within 1.0 cm, or within 0.2 cm, or within 0.05 to 0.2 cm, of the path taken by the outer end edge of the end portion of the glass sheet G‴ when the side mold portion 78‴ moves from the lowered position to the raised position. Furthermore, the inner end 82‴ may move laterally by a distance in the range of 0.5 to 15 cm, for example, so that the inner end 82‴ contacts or is spaced away from the intermediate mold portion 72″, or other side mold portion (not shown), by a distance in the range of 0.01 to 0.3 cm, or by a distance of 0.3 cm or less, when the side mold portion 78‴ is in the raised position. In addition, the inner end 82‴ may only move vertically by a distance in the range of 0.05 to 3.0 cm, for example. As another example, the inner end 82‴ of the side mold portion 78‴ may move laterally by a first distance and vertically by a second distance when the side mold portion 78‴ moves from the lowered position to the raised position, wherein the first distance may be at least four times, or at least six times, or at least eight times the second distance.

Figure 18:
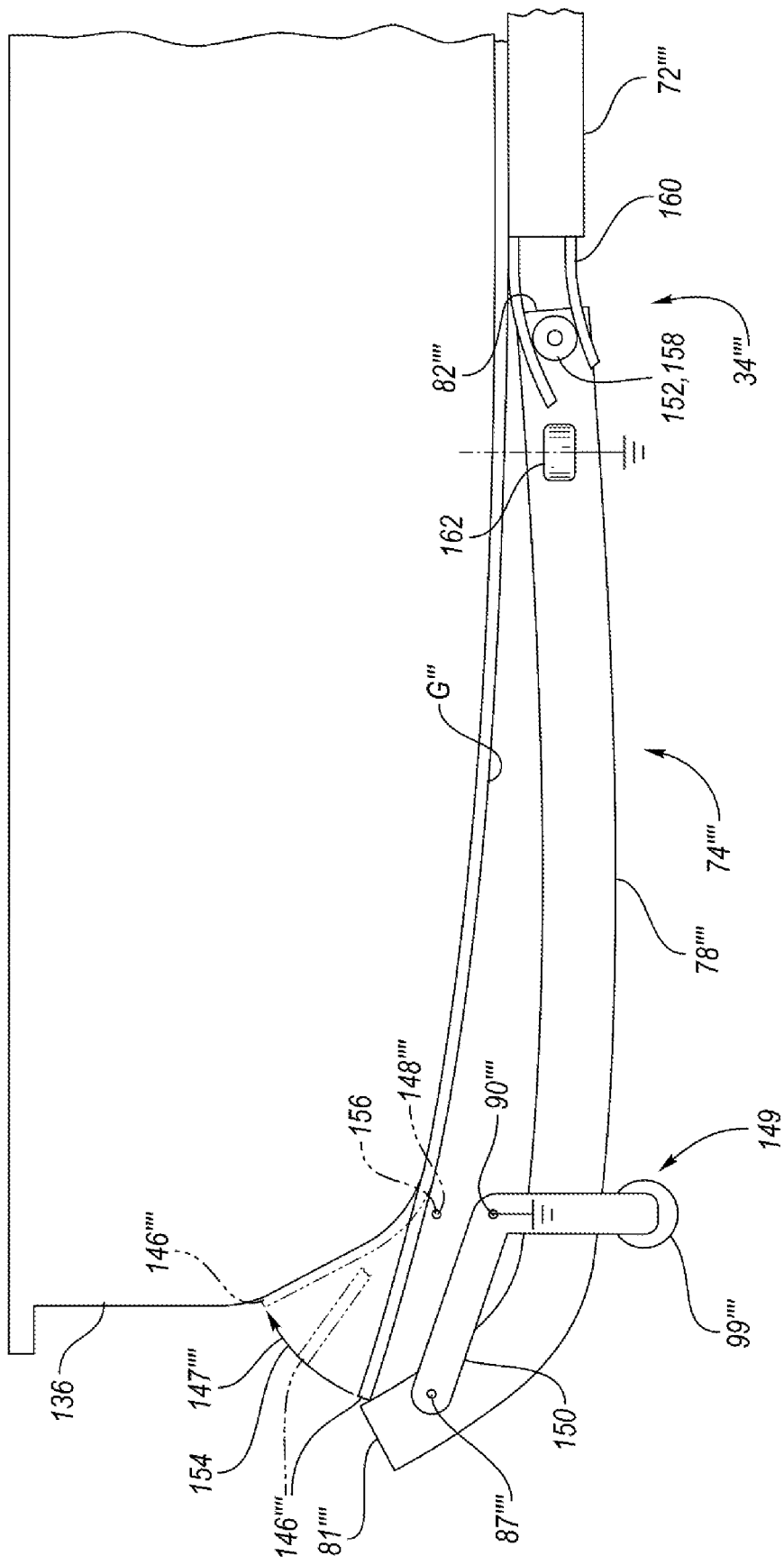
FIG. 18 is a schematic view of a portion of an articulated mold arrangement, according to the disclosure, that includes another example configuration of a movement facilitating assembly for guiding movement of a side mold portion of the articulated mold arrangement, wherein the side mold portion is shown in a lowered position.
Figure 19:
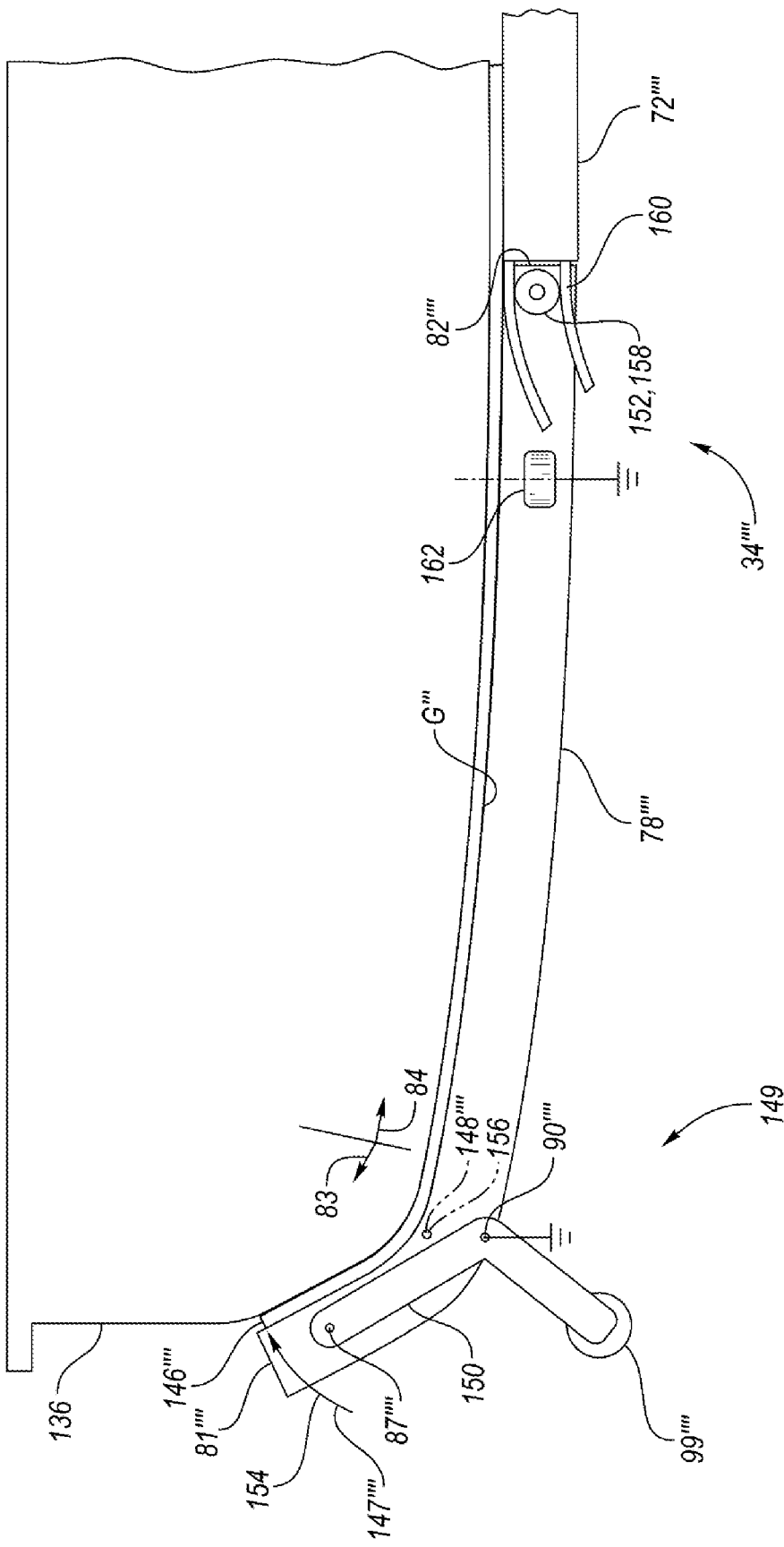
FIG. 19 is a schematic view similar to FIG. 18 showing the side mold portion of the articulated mold arrangement in a raised position.

FIGS. 18 and 19 are schematic views of a portion of an articulated lower mold arrangement 34″″ that includes another example configuration of a movement facilitating assembly 149 for guiding movement of the associated side mold portion 78″″. Furthermore, the movement facilitating assembly 149 shown in FIGS. 18 and 19 may be used with any of the above described lower mold arrangements. The movement facilitating assembly 149 includes first and second guide members 150 and 152, respectively, for guiding movement of the side mold portion 78″″, when the side mold portion 78″″ is moved from a lowered position, shown in FIG. 18, to a raised position, shown in FIG. 19, such as described above with respect to the other lower mold arrangements. In this embodiment, however, at least one of the guide members 150, 152 is formed as a rotatable member (e.g., a roller) or a guide for receiving a rotatable member.

In the illustrated embodiment, the first guide member 150 is formed as a pivotable link that is pivotally attached to the side mold portion 78″″ proximate a first or outer end 81″″ of the side mold portion 78″″, such as described above in detail. In this embodiment, however, pivot axes or points 87″″ and 90″″ of the first guide member 150 have been moved downwardly compared to the pivot points 87‴ and 90‴ of the first link 85‴ of the linkage assembly 80‴, shown in FIG.

16, in order to provide clearance to the mold 136 and to shorten connecting members or linkages to a synchronization shaft 99"" that may pass under the side mold portion 78"" in order to coordinate movement of the near and far sides (in and out of the paper) of the side mold portion 78"". Moving the pivot points in such a manner may have a small effect on the path of the outer end 81"" of the side mold portion 78"", so the location of the pivot points 87"" and 90"" may need to be adjusted to make the corresponding side mold portion path 154 and glass sheet end edge path 147"" substantially the same, such as described above with respect to the lower mold arrangement 34''' shown in FIG. 16. For example, the location of the lowered pivot points 87"" and 90"" may be selected (e.g., adjusted laterally with respect to the pivot points 87''' and 90''' shown in FIGS. 16 and 17) to produce the path 154 (e.g., an arc of the glass contact point on the side mold portion 78") so that it is identical or substantially the same as an arc centered on pivot axis or point 156, which represents the location of the pivot point 90''' from FIGS. 16 and 17. Furthermore, the pivot point 156 may be aligned with the center point 148"" for the arc 147"".

In addition, in the embodiment shown in FIGS. 18 and 19, the second guide member 152 is formed as a rotatable member or roller 158 that is rotatably connected to the side mold portion 78"" proximate a second or inner end 82"" of the side mold portion 78"". Furthermore, the roller 158 is received in a stationary guide 160 (e.g., track or channel) that is formed on a support structure or an intermediate mold portion 72"" of the lower mold arrangement 34"". Like the second link 91 described above with respect to the lower mold arrangement 34, the roller 158 and associated guide 160 are configured to guide movement of the inner end 82"" of the side mold portion 78"" so that the inner end 82"" moves substantially laterally inwardly toward the intermediate mold portion 72"" or other side mold portion (not shown), when the side mold portion 78"" moves from the lowered position (shown in FIG. 18) to the raised position (shown in FIG. 19). The guide 160 may also have an angled portion that extends slightly upwardly (e.g., at an angle in the range of 3 to 10°) or a curved portion, so that the inner end 82"" of the side mold portion 78"" may be guided slightly upwardly (e.g., at a distance in the range of 0.05 to 3 cm) as it moves laterally inwardly. In the embodiment shown in FIGS. 18 and 19, the guide 160 defines a curved path for the roller 158 so that the inner end 82"" of the side mold portion 78"" will move along a path that is the same as or similar to the arc 144 shown in FIG. 16 when the side mold portion 78"" moves from the lowered position to the raised position. The above configuration may be advantageous when available vertical space is limited, for example.

As shown in FIGS. 18 and 19, the movement facilitating assembly 149 may further include one or more side guide members, such as rollers 162, that are connected to a frame member, or other support structure, and that are engageable with a side face of the side mold portion 78"" (e.g., vertical side face) to inhibit transverse motion (e.g., in a direction in and out of the paper in the illustrated embodiment) of the side mold portion 78"" as the side mold portion 78"" moves relative to the frame member or other support structure between the lowered and raised positions. As another example, the movement facilitating assembly 149 may include one or more side guide members, such as rollers that are rotatably mounted on the side mold portion 78"" and engageable with a frame member or other support structure (e.g., vertical face of such a frame member or support structure). Such rollers may likewise guide the side mold portion 78"" and inhibit transverse motion.

While exemplary embodiments are described above, it is not intended that these embodiments describe all possible forms according to the disclosure. In that regard, the words used in the specification are words of description rather than limitation, and it is understood that various changes may be made without departing from the spirit and scope of the disclosure. Additionally, the features of various implementing embodiments may be combined to form further embodiments according to the disclosure.

What is claimed is:

1. An articulated lower mold arrangement for use with an upper mold in a glass bending system, the articulated lower mold arrangement comprising:
   a mold portion configured to bend a heated glass sheet, the mold portion having a first end, a area proximate the first end for bending an end portion of the glass sheet, and a second end opposite the first end and spaced away from the bend area;
   a first guide member connected to the mold portion at a first location proximate the first end; and
   a second guide member connected to the mold portion at a second location proximate the second end and spaced away from the bend area;
   wherein the mold portion and the first and second guide members are configured to cooperate to allow the first end of the mold portion to move from a lowered position to a raised position in order to move the end portion of the glass sheet upwardly and so that the first end of the mold portion moves along a path substantially the same as a path taken by an end edge of the end portion of the glass sheet, while also allowing the second end of the mold portion to move upwardly and substantially laterally.

2. The articulated lower mold arrangement of claim 1 wherein the first guide member comprises a first link pivotally connected to the mold portion at the first location so that the first link is pivotable about a first axis that extends through the first location, the first link further being pivotally connected to a first support member, and wherein the second guide member comprises a second link pivotally connected to the mold portion at the second location so that the second link is pivotable about a second axis that extends through the second location, the second link further being pivotally connected to a second support member.

3. The articulated lower mold arrangement of claim 2 wherein the first and second support members are part of a support structure.

4. The articulated lower mold arrangement of claim 1 further comprising a glass support pad at least partially positioned inside of the mold portion for supporting the glass sheet, wherein the mold portion is movable with respect to the glass support pad.

5. The articulated lower mold arrangement of claim 1 wherein one of the first and second guide members comprises a roller or a guide for a roller.

6. The articulated lower mold arrangement of claim 1 wherein the first guide member comprises a first link pivotally connected to the mold portion at the first location so that the first link is pivotable about a first axis that extends through the first location, the first link further being pivotally connected to a first support member, and wherein the second guide member comprises a roller rotatably connected to the mold portion at the second location, the roller being movable along a guide that is connected to a second support member.

7. The articulated lower mold arrangement of claim 6 further comprising a side roller positioned to engage a side of the mold portion to facilitate movement of the roller along the guide.

8. The articulated lower mold arrangement of claim 1 wherein the first guide member comprises a first link pivotally connected to the mold portion at the first location so that the first link is pivotable about a first axis that extends through the first location, and the first link is also pivotally connected to a first support member at an additional location so that the first link is pivotable about an additional axis that extends through the additional location, and wherein the additional axis extends above a section of the mold portion or through the mold portion when the first end of the mold portion is in the lowered position.

9. The articulated lower mold arrangement of claim 8 wherein the additional axis extends above the section of the mold portion when the first end of the mold portion is in the lowered position.

10. A glass sheet bending apparatus comprising an upper mold and the lower mold arrangement of claim 1, wherein the first end of the mold portion is configured to move the end portion of the glass sheet upwardly toward a mold surface of the upper mold to wrap the end portion of the glass sheet against the mold surface of the upper mold when the first end of the mold portion is moved from the lowered position to the raised position.

11. An articulated lower mold arrangement for use with an upper mold for bending a heated glass sheet, the lower mold arrangement comprising:
   first and second side portions that each include:
      a side mold portion having an outer end, an inner end, and a mold surface that defines outer and inner mold areas, wherein the outer mold area comprises a sharp bend area positioned near the outer end of the side mold portion for bending a respective end portion of the glass sheet, and the inner mold area extends from the outer mold area to the inner end of the side mold portion and comprises a flat area or a curved area having a larger radius of curvature than the sharp bend area;
      a first guide member connected to the side mold portion at a first location proximate the outer end; and
      a second guide member connected to the side mold portion at a second location proximate the inner end and spaced laterally away from the sharp bend area;
   wherein, for each side portion, the side mold portion and the first and second guide members are configured to cooperate to allow the outer end of the side mold portion to move from a lowered position to a raised position in order to move the respective end portion of the glass sheet toward a mold surface of the upper mold and so that the outer end of the side mold portion moves along a path substantially the same as a path taken by an end edge of the respective end portion of the glass sheet, while also allowing the inner end of the side mold portion to move upwardly and substantially laterally toward the inner end of the other side mold portion.

12. The lower mold arrangement of claim 11 wherein the side mold portions each form part of a lower press ring, and wherein the inner end of each side mold portion is positioned proximate a vertical central plane of the lower press ring.

13. The lower mold arrangement of claim 12 wherein the inner ends of the side mold portions contact each other or are spaced apart from each other by a distance of 0.3 cm or less when each side mold portion is in the raised position.

14. The lower mold arrangement of claim 11 further comprising an intermediate mold portion positioned between the side mold portions, wherein each side mold portion is movable relative to the intermediate mold portion, and each side mold portion has a length that is at least as long as a length of the intermediate mold portion.

15. The lower mold arrangement of claim 14 wherein, for each side mold portion, the inner end contacts the intermediate mold portion, or is spaced away from the intermediate mold portion by a distance of 0.3 cm or less, when the side mold portion is in the raised position.

16. An articulated lower mold arrangement for use with an upper mold in a glass bending system, the articulated lower mold arrangement comprising:
   a mold portion configured to bend a heated glass sheet, the mold portion having a first end, a bend area proximate the first end for bending an end portion of the glass sheet, and a second end opposite the first end and spaced away from the bend area;
   a first guide member connected to the mold portion at a first location proximate the first end; and
   a second guide member connected to the mold portion at a second location proximate the second end and spaced away from the bend area;
   wherein the mold portion and the first and second guide members are configured to cooperate to allow the first end of the mold portion to move from a lowered position to a raised position in order to move the end portion of the glass sheet upwardly, while also allowing the second end of the mold portion to move laterally, and wherein the first guide member comprises a first link pivotally connected to the mold portion at the first location so that the first link is pivotable about a first axis that extends through the first location.

17. The articulated lower mold arrangement of claim 16 wherein the second guide member comprises a second link pivotally connected to the mold portion at the second location so that the second link is pivotable about a second axis that extends through the second location.

18. The articulated lower mold arrangement of claim 16 further comprising a glass support pad at least partially positioned inside an outer boundary of the mold portion for supporting the glass sheet, wherein the mold portion is movable with respect to the glass support pad.

19. The articulated lower mold arrangement of claim 16 wherein the second guide member comprises a roller or a guide for a roller.

20. The articulated lower mold arrangement of claim 16 wherein the second guide member comprises a roller rotatably connected to the mold portion at the second location, the roller being movable along a guide that is connected to a second support member.

21. An articulated lower mold arrangement for use with an upper mold in a glass bending system, the articulated lower mold arrangement comprising:
   a mold portion configured to bend a heated glass sheet, the mold portion having a first end, a bend area proximate the first end for bending an end portion of the glass sheet, and a second end opposite the first end and spaced away from the bend area;
   a first guide member connected to the mold portion at a first location proximate the first end;
   a second guide member connected to the mold portion at a second location proximate the second end and spaced away from the bend area; and
   a glass support pad at least partially positioned inside of the mold portion for supporting the glass sheet;

wherein the mold portion and the first and second guide members are configured to cooperate to allow the first end of the mold portion to move from a lowered position to a raised position in order to move the end portion of the glass sheet upwardly, while also allowing the second end of the mold portion to move laterally, and wherein the mold portion is movable with respect to the glass support pad.

22. An articulated lower mold arrangement for use with an upper mold in a glass bending system, the articulated lower mold arrangement comprising:
   a mold portion configured to bend a heated glass sheet, the mold portion having a first end, a bend area proximate the first end for bending an end portion of the glass sheet, and a second end opposite the first end and spaced away from the bend area;
   a first guide member connected to the mold portion at a first location proximate the first end; and
   a second guide member connected to the mold portion at a second location proximate the second end and spaced away from the bend area;
   wherein the mold portion and the first and second guide members are configured to cooperate to allow the first end of the mold portion to move from a lowered position to a raised position in order to move the end portion of the glass sheet upwardly, while also allowing the second end of the mold portion to move laterally, and wherein one of the first and second guide members comprises a roller or a guide for a roller.

23. An articulated lower mold arrangement for use with an upper mold for bending a heated glass sheet, the lower mold arrangement comprising:
   first and second side portions that each include:
      a side mold portion having an outer end, an inner end, and a mold surface that defines outer and inner mold areas, wherein the outer mold area comprises a bend area positioned near the outer end of the side mold portion for bending a respective end portion of the glass sheet, and the inner mold area extends from the outer mold area to the inner end of the side mold portion and comprises a flat area or a curved area having a larger radius of curvature than the bend area;
      a first guide member connected to the side mold portion at a first location proximate the outer end; and
      a second guide member connected to the side mold portion at a second location proximate the inner end and spaced laterally away from the bend area; and
   an intermediate mold portion positioned between the side mold portions;
   wherein, for each side portion, the side mold portion and the first and second guide members are configured to cooperate to allow the outer end of the side mold portion to move from a lowered position to a raised position in order to move the respective end portion of the glass sheet toward a mold surface of the upper mold, while also allowing the inner end of the side mold portion to move laterally toward the inner end of the other side mold portion, wherein each side mold portion is movable relative to the intermediate mold portion, and each side mold portion has a length that is at least as long as a length of the intermediate mold portion.

24. The articulated lower mold arrangement of claim 23 wherein, for each side portion, the first guide member comprises a first link pivotally connected to the side mold portion at the first location so that the first link is pivotable about a first axis that extends through the first location.

25. The articulated lower mold arrangement of claim 23 wherein, for each side portion, the second guide member comprises a second link pivotally connected to the side mold portion at the second location so that the second link is pivotable about a second axis that extends through the second location.

26. The articulated lower mold arrangement of claim 23 wherein, for each side portion, one of the first and second guide members comprises a roller or a guide for a roller.

\* \* \* \* \*